US011377783B2

(12) United States Patent
Lee

(10) Patent No.: US 11,377,783 B2
(45) Date of Patent: Jul. 5, 2022

(54) DEVICE AND METHOD FOR CUTTING RAW FABRIC

(71) Applicant: Cafe24 Corp., Seoul (KR)

(72) Inventor: Jae Suk Lee, Seoul (KR)

(73) Assignee: Cafe24 Corp., Seoul (KR)

( * ) Notice: Subject to any disclaimer, the term of this patent is extended or adjusted under 35 U.S.C. 154(b) by 784 days.

(21) Appl. No.: 16/317,810

(22) PCT Filed: Jul. 14, 2016

(86) PCT No.: PCT/KR2016/007688
§ 371 (c)(1),
(2) Date: May 15, 2019

(87) PCT Pub. No.: WO2018/012655
PCT Pub. Date: Jan. 18, 2018

(65) Prior Publication Data
US 2021/0285151 A1 Sep. 16, 2021

(51) Int. Cl.
*B29C 65/00* (2006.01)
*D06H 7/04* (2006.01)
(Continued)

(52) U.S. Cl.
CPC .............. *D06H 7/04* (2013.01); *B29C 65/50* (2013.01); *B29C 65/5057* (2013.01); *B29C 65/5064* (2013.01); *D06H 7/005* (2013.01)

(58) Field of Classification Search
CPC .... D06H 7/005; B29C 65/50; B29C 65/5042; B29C 65/5064
See application file for complete search history.

(56) References Cited

U.S. PATENT DOCUMENTS 3,810,805 A * 5/1974 Goldsworthy ........ B29C 70/388
156/361
4,680,442 A * 7/1987 Bauer .................. B23K 26/147
219/121.67
(Continued)

FOREIGN PATENT DOCUMENTS

JP 2002307379 A 10/2002
JP 2009-184061 A 8/2009
(Continued)

OTHER PUBLICATIONS

Translation of specification of Lee (KR 10 1485508) (Year: 2013).*

*Primary Examiner* — Philip C Tucker
*Assistant Examiner* — Nickolas R Harm
(74) *Attorney, Agent, or Firm* — Inventstone Patent, LLC

(57) ABSTRACT

An aspect of the present invention provides a raw fabric cutting device. The device comprises: a support portion for supporting a raw fabric; a compressing portion for evacuating the space between a cover arranged on the raw fabric and the support portion such that the raw fabric is compressed; a cutting portion transferred above the support portion so as to cut the raw fabric; and a sealing portion transferred together with the cutting portion and configured to supply a sealing member to an open area of the cover, which is exposed as the raw fabric is cut, thereby covering the open area, wherein the sealing portion comprises a sealing member cutting portion for forming a notch on at least one side of the sealing member in the transverse direction with regard to the direction of transfer of the sealing member.

26 Claims, 27 Drawing Sheets

(51) Int. Cl.
   *B29C 65/50*      (2006.01)
   *D06H 7/00*       (2006.01)

(56) References Cited

U.S. PATENT DOCUMENTS

| | | | | |
|---|---|---|---|---|
| 5,061,331 | A | * | 10/1991 | Gute .................... D06H 7/223 |
| | | | | 156/64 |
| 5,256,238 | A | * | 10/1993 | Gerber .................. A41H 43/02 |
| | | | | 112/131 |
| 5,481,083 | A | * | 1/1996 | Smyth, Jr. .......... B23K 26/0838 |
| | | | | 219/121.67 |
| 7,320,351 | B2 | * | 1/2008 | Chern ................ B65H 35/0033 |
| | | | | 156/523 |
| 7,615,128 | B2 | * | 11/2009 | Mikkelsen ............... B26D 7/34 |
| | | | | 156/250 |
| 2013/0104713 | A1 | | 5/2013 | Kawaguchi et al. |
| 2015/0013514 | A1 | * | 1/2015 | Strauss .................. B32B 5/024 |
| | | | | 83/29 |
| 2018/0016472 | A1 | * | 1/2018 | Lodde .................... B65H 35/02 |

FOREIGN PATENT DOCUMENTS

| | | | |
|---|---|---|---|
| JP | 2013-091133 | A | 5/2013 |
| KR | 20-0321862 | Y1 | 7/2003 |
| KR | 10-0678607 | A | 1/2007 |
| KR | 2004-0029928 | A | 4/2014 |
| KR | 10-1485508 | B1 | 1/2015 |

* cited by examiner

DEVICE AND METHOD FOR CUTTING RAW FABRIC

CROSS-REFERENCE TO RELATED APPLICATIONS

This application is a national stage of International Application No. PCT/KR2016/007688, filed 14 Jul. 2016 the disclosures of which are incorporated herein by reference.

BACKGROUND OF THE INVENTION

Field of the Invention

The present invention relates to a device and method for cutting raw fabric and, more particularly, to a device and method for cutting a raw fabric that allows for cutting a stack of raw fabrics.

Related Art

Fabric treatment includes a design process for forming a predetermined pattern by determining a design and drawing or printing it on fabric, a fabric cutting process for cutting fabric in a pattern formed on the fabric, and a fabric sewing process for sewing the cut pieces of fabric.

Out of these processes, the fabric cutting process is a process in which a plurality of fabrics with a pattern on them are stacked upon one another and cut in that pattern. At this time, a cutting device is used for the fabric cutting process. Fabric is cut using the cutting device such as a razor, cutter blade, etc.

One of conventional cutting device is a device that includes a loom used to weave fabrics in order to cut the fabrics into regular-sized pieces without error, a frame with a cutting table, and a band cutter for horizontally cutting fabrics. When using this device, a stack of fabrics may be strewn due to stress applied from the band cuter in the process of cutting the stack of fabrics. This makes it difficult to cut fabrics accurately. In view of this, compressed fabric cutting technique may be applied.

Conventional compressed fabric cutting technique is a technique in which a stack of raw fabrics are placed inside a sealing member, an evacuation unit evacuates the inside of the sealing member to compress the stack of raw fabrics, and a cutting unit cuts the compressed fabrics while being transferred above the compressed fabrics.

However, in the conventional compressed fabric cutting technique, an open area is formed where the sealing member is exposed by cutting raw fabrics. Thus, the fabrics compressed inside the sealing member may inflate out of the sealing member through the open area. Therefore, the fabrics and the sealing member may move freely. As such, the free movement of the fabrics and the sealing member makes it difficult to cut the fabrics accurately. This problem will lead to serious errors in cutting fabrics, especially in a curved section.

SUMMARY OF THE INVENTION

The present invention provides a raw fabric cutting device that can effectively cut a stack of raw fabrics in a curved section, as well as in a linear section, by sealing an open area formed on a cover in real time.

An aspect of the present invention provides a raw fabric cutting device comprising: a support portion for supporting a raw fabric; a compressing portion for compressing the raw fabric by evacuating the space between a cover placed over the raw fabric and the support portion; a cutting portion that is transferred above the support portion and cuts the raw fabric; and a sealing portion that is transferred along with the cutting portion and feeds a sealing member to an open area of the cover to enclose the open area which is exposed as the raw fabric is cut, wherein the sealing member is formed with notches on at least one side, transversely to the direction of transfer of the sealing member.

The sealing member may comprise tape that sticks to the open area by adhesive power and is coated with an adhesive on one side.

The sealing member may have a width corresponding to the size of the notches.

Another aspect of the present invention provides a raw fabric cutting device comprising: a support portion for supporting a raw fabric; a compressing portion for compressing the raw fabric by evacuating the space between a cover placed over the raw fabric and the support portion; a cutting portion that is transferred above the support portion and cuts the raw fabric; and a sealing portion that is transferred along with the cutting portion and feeds a sealing member to an open area of the cover to enclose the open area which is exposed as the raw fabric is cut, wherein the sealing portion comprises a sealing member cutting portion for forming notches on at least one side of the sealing member, transversely to the direction of transfer of the sealing member.

The sealing member cutting portion may form notches with a predetermined spacing on at least one side of the sealing member, transversely to the direction of transfer of the sealing member.

The sealing member cutting portion may form notches on opposite sides of the sealing member, transversely to the direction of transfer of the sealing member, in such a manner that the spacing between notches on a first side and the spacing between notches on a second are different from each other.

The sealing member cutting portion may form notches with a predetermined spacing in a face-to-face manner on opposite sides of the sealing member.

The sealing member cutting portion may form notches with a first spacing on either side of the sealing member, wherein the notches are formed in a staggered manner on opposite sides of the sealing member such that those on one side have a second spacing from the corresponding ones on the other side.

The width of the notches at at least one side of the sealing member may be equal to or greater than the width of the notches near the center of the sealing member.

The shape of the notches may comprise at least one of linear, triangular, rectangular, pentagonal, and semicircular shapes.

The raw fabric cutting device may further comprise a link portion connecting the cutting portion and the sealing portion, the link portion comprising: a first link configured at the rear of the cutting portion relative to the direction of transfer of the cutting portion; a second link configured at the foremost part of the sealing portion so as to correspond to the first link; and a link pin fastened to the first and second links so that the sealing portion rotates along with the cutting portion.

The sealing portion may comprise: a main body inside which the sealing member is supported; a reel around which the sealing member is wound; a guide roller positioned over an outlet at the bottom of the main body so as to draw the sealing member out of the main body from the reel; and a pressure roller that is supported on the main body and presses the sealing member, drawn down to the outlet by the guide roller, to the open area.

The sealing portion may further comprise a pressure roller support that supports the pressure roller from the main body, the pressure roller support comprising: a stationary portion supported on the main body; a movable portion that supports the pressure roller and slides from the stationary portion; and an elastic body that is placed between the stationary portion and the movable portion and elastically supports the movable portion from the stationary portion.

The sealing member cutting portion may comprise: a cutter transfer portion attached to the main body; and a cutter that is connected to the cutter transfer portion and forms notches on the sealing member.

The cutter may form notches on the sealing member between the guide roller and the pressure roller.

The cutter may form notches on the sealing member between the reel and the guide roller.

The cutter may comprise one blade and forms notches on the sealing member by reciprocating movement.

The sealing member cutting portion may further comprise a support that is positioned on the other side of the cutter, with the sealing member in between, and supports the sealing member when the sealing member is cut.

The cutter may comprise a top blade and a bottom blade, and forms notches on the sealing member as the top blade and the bottom blade engage.

The cutter transfer portion may transfer the cutter either transversely or longitudinally to the direction of transfer of the sealing member to allow the cutter to form notches.

The raw fabric cutting device may further comprise a sealing member separating portion that is located at the bottom of the main body, opposite to the direction of transfer relative to the pressure roller, and completely cuts and separates the sealing member.

The raw fabric cutting device may further comprise a controller that controls the cutting portion and the sealing portion by a raw fabric cutting program, wherein the controller calculates a cutting line by parsing the raw fabric cutting program and controls the sealing member cutting portion along the calculated line.

The controller may control the sealing member cutting portion to extract a curved section from the calculated line and form the notches in the extracted curved section.

The controller may determine the spacing between notches formed on at least one side of the sealing member according to the curvature of the extracted curved section.

The controller may determine the shape of notches formed on at least one side of the sealing member according to the curvature of the extracted curved section.

The controller may determine the central angle of triangular notches formed on at least one side of the sealing member according to the curvature of the extracted curved section.

Still another aspect of the present invention provides a raw fabric cutting method comprising: compressing a raw fabric by evacuating the space between a cover placed over the raw fabric and a support portion for supporting the raw fabric; cutting the raw fabric by using a cutting portion being transferred above the support portion; and feeding a sealing member by a sealing portion to an open area of the cover to enclose the open area which is exposed as the raw fabric is cut, the sealing portion being transferred along with the cutting portion, wherein the sealing comprises forming notches on at least one side, transversely to the direction of transfer of the sealing member.

The raw fabric cutting method may further comprise controlling the cutting portion and the sealing portion by a raw fabric cutting program, the controlling comprising: calculating a cutting line by parsing the raw fabric cutting program; extracting a curved section from the calculated line; calculating the curvature of the extracted curved section; and forming notches according to the calculated curvature.

The forming of notches may comprise determining parameters related to notches formed on at least one side of the sealing member according to the curvature of the extracted curved section.

One advantage of a raw fabric cutting device according to an aspect of the present invention is that the fabrics can be cut precisely by sealing, in real time, the open area formed on the cover in a raw fabric cutting process, thereby improving the quality of cut fabrics.

Another advantage of a raw fabric cutting device according to an aspect of the present invention is that a stack of raw fabrics can be cut in a curved section, as well as in a linear section, without being strewn, thereby improving the productivity of fabric treatment.

DESCRIPTION OF EXEMPLARY EMBODIMENTS

Figure 1:
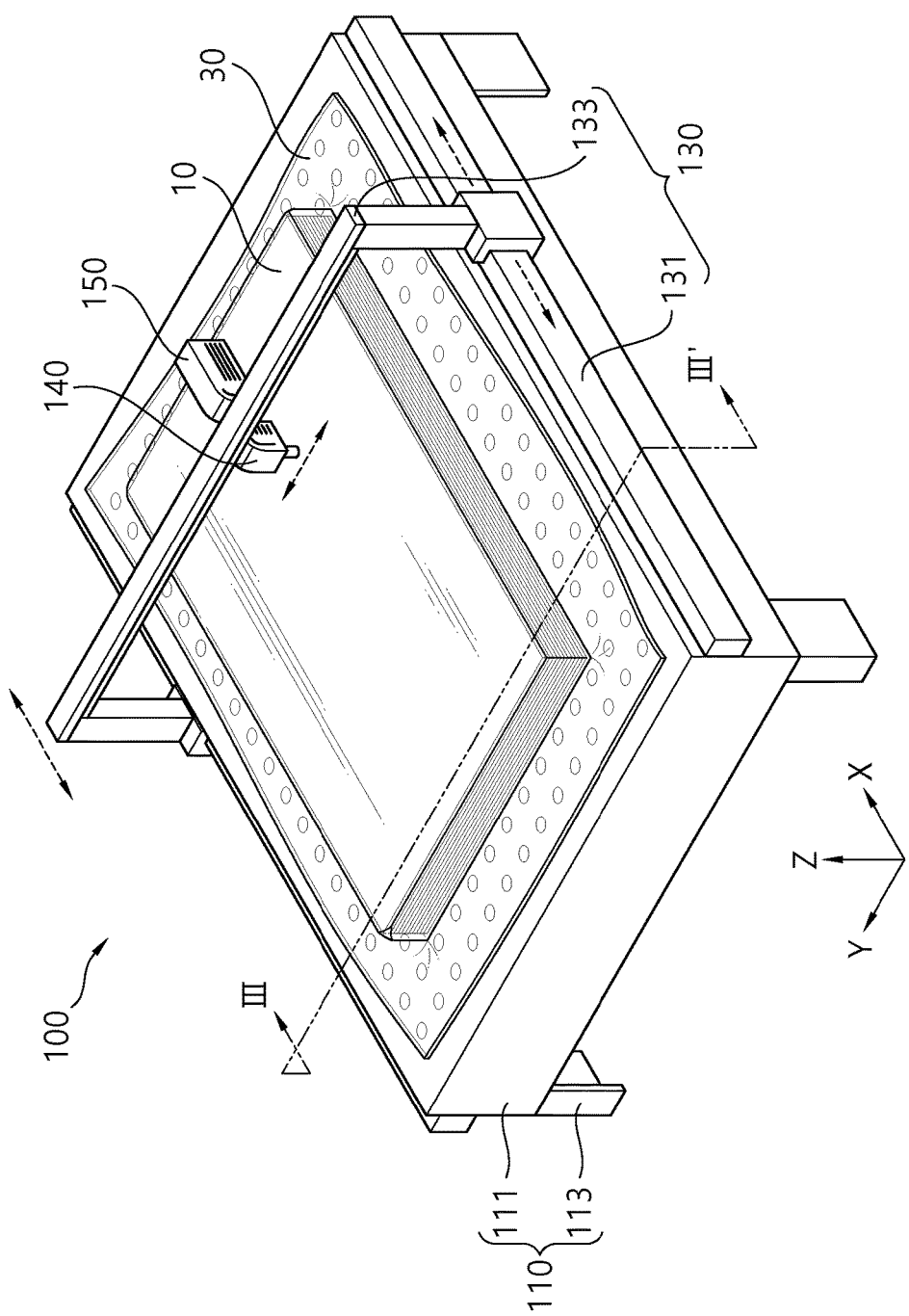
FIG. 1 is a perspective view of a raw fabric cutting device according to an exemplary embodiment of the present invention.

The present disclosure may be modified in various ways and may include various embodiments. Specific exemplary embodiments will be illustrated in the drawings and described in detail.

It is however to be understood that the present disclosure is not intended to be limited to the specific embodiments but the specific embodiments include all modifications, equivalents, and substitutions that fall within the spirit and technical scope of the present disclosure.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terms used herein are used merely to describe specific embodiments, but are not intended to limit the present invention. The singular expressions used herein include plural expressions unless explicitly stated otherwise in the context thereof. It should be appreciated that in this application, the use of the terms "include(s)," "comprise(s)", "including" and "comprising" is intended to denote the presence of the characteristics, numbers, steps, operations, elements, or components described herein, or combinations thereof, but is not intended to exclude the probability of presence or addition of one or more other characteristics, numbers, steps, operations, elements, components, or combinations thereof.

Unless defined otherwise, all the terms used herein have the same meanings as typically understood by those having the ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Exemplary embodiments of the present disclosure will be described in detail below with reference to the accompanying drawings. In the following description of the present disclosure, in order to help a general understanding of the present disclosure, the same reference numerals will be used to denote the same elements throughout the drawings, and redundant descriptions of the same elements will be omitted.

Figure 2:
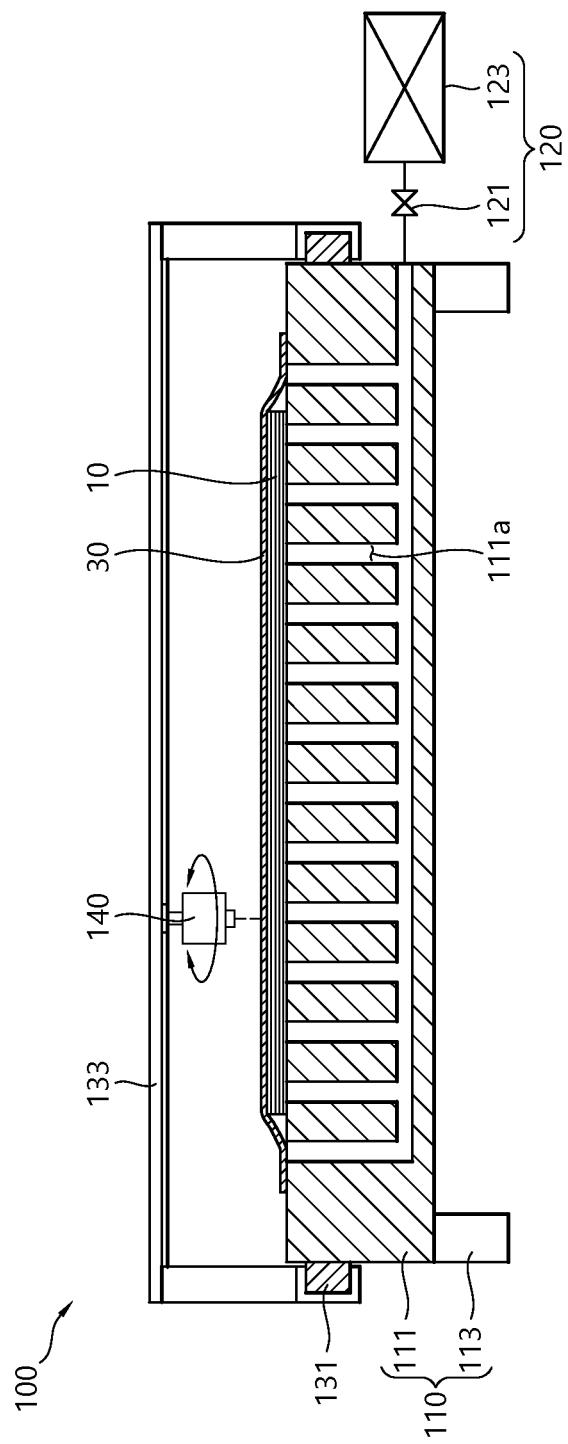
FIG. 2 is a cross-sectional view taken along the line of FIG. 1 from the raw fabric cutting device according to an exemplary embodiment of the present invention.

FIG. 1 is a perspective view of a raw fabric cutting device according to an exemplary embodiment of the present invention. FIG. 2 is a cross-sectional view taken along the line of FIG. 1 from the raw fabric cutting device according to an exemplary embodiment of the present invention.

Referring to FIGS. 1 and 2, the raw fabric cutting device 100 according to the present exemplary embodiment includes a support portion 110, a compressing portion 120, a transfer portion 130, a cutting portion 140, and a sealing portion 150.

First of all, a stack of raw fabrics 10 (hereinafter, referred to as fabrics) and a cover 30 are placed one on top of the other. In this case, the cover 30 placed over the fabrics 10 may be made from transparent resin such as vinyl that covers a wider area than the fabrics 10.

The support portion 110 may include a plate 111 and a plurality of frames 113. The plate 111 helps evenly support the fabrics 10 and the cover 30. The plurality of frames 113 are placed under the plate 111 and support the plate 111.

As the fabrics 10 are supported on the plate 111 and the cover 30 is seated over the fabrics 10 while covering a wider area than the fabrics 10, a space created from the fabrics 10 is formed between the topside of the plate 111 and the underside of the cover 30. Here, the compressing portion 120 evacuates the space between the plate 111 and the cover 30 to compress the fabrics 10.

The compressing portion 120 includes a vacuum pump 121 and a control valve 123.

The vacuum pump 121 is connected to a plurality of evacuation holes 111a formed in the plate 111. The vacuum pump 121 allows the fabrics 10 and the cover 30 to tightly adhere to the plate 111 by evacuating the space between the plate 111 and the cover 30. In this instance, the fabrics 10 are compressed between the plate 111 and the cover 30 by a force applied by the cover 30 adhering tightly to the plate 111. The control valve 123 may be located between the evacuation holes 111 and the vacuum pump 121. The control valve 123 controls the vacuum pump's evacuation force applied between the plate 111 and the cover 30.

Meanwhile, the transfer portion 130 transfers the cutting portion 140 and the sealing portion 150 in a flat plane above the plate 111. The transfer portion 130 includes first and second linear actuators 131 and 133.

The first linear actuator 131 may be located on the outer side of the plate 111. The first linear actuator 131 transfers the second linear actuator 133 connected to the top along the x axis. The second linear actuator 133 transfers the cutting portion 140 connected to one side along the y axis. Here, the first and second linear actuators 131 and 133 may be implemented by a combination of a rack and a pinion, a combination of a linear guide and a linear motor, and a hydraulic/pneumatic cylinder.

Meanwhile, the cutting portion 140 is supported on the second linear actuator 133 so as to rotate with respect to the plate 111 in the planar direction. The sealing portion 150 is connected to one side of the cutting portion 140 (see FIG. 4). As such, the sealing portion 150 may be transferred along with the cutting portion 140. Here, a detailed description of the cutting portion 140 will be omitted since it is well known in the art, and the sealing portion 150 will be described below in detail.

Figure 3:
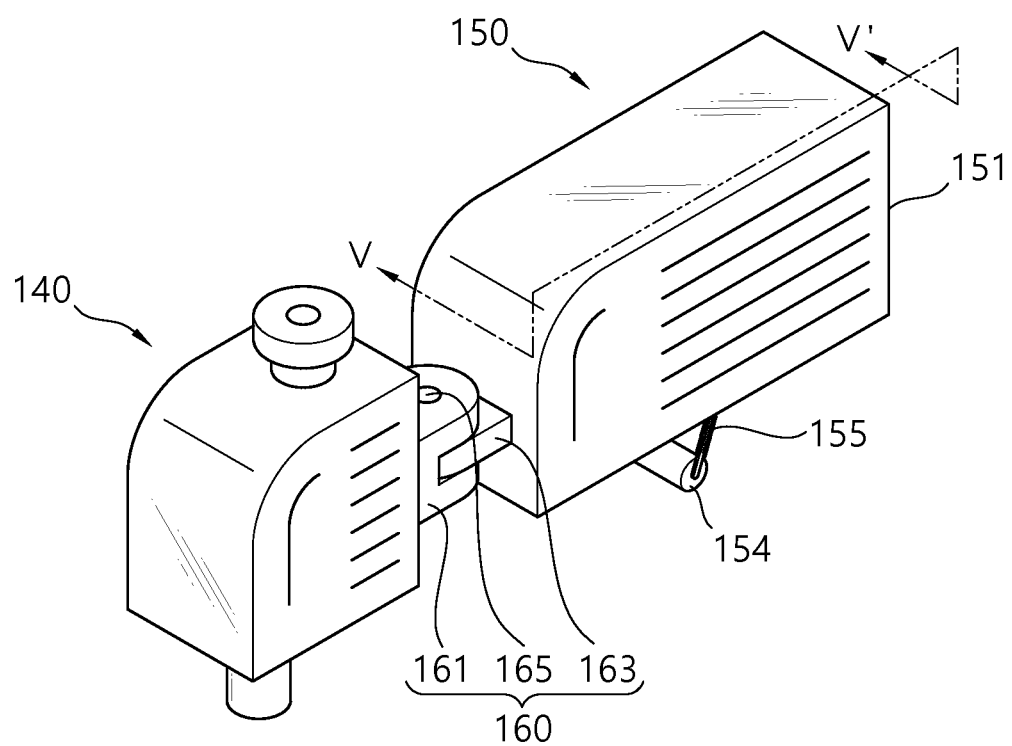
FIG. 3 is a perspective view of a structure connecting the cutting portion and the sealing portion according to an exemplary embodiment of the present invention.

FIG. 3 is a perspective view of a structure connecting the cutting portion and the sealing portion according to an exemplary embodiment of the present invention.

Referring to FIG. 3, the cutting portion 140 and sealing portion 150 according to the present exemplary embodiment are connected by a link portion 160.

The link portion 160 may include first and second links 161 and 163 and a link pin 165.

The first link 161 is provided at the rear of the cutting portion 140 relative to the direction of transfer of the cutting portion 140. The second link 163 is provided at the foremost part of the sealing portion 150 facing the rear of the cutting portion 140. The first and second links 161 and 163 are joined together by an interlink pin 165 so that the sealing portion 150 behind the cutting portion 140 is transferred along with the cutting portion 140 and rotates freely on the cutting portion 140.

Figure 4A:
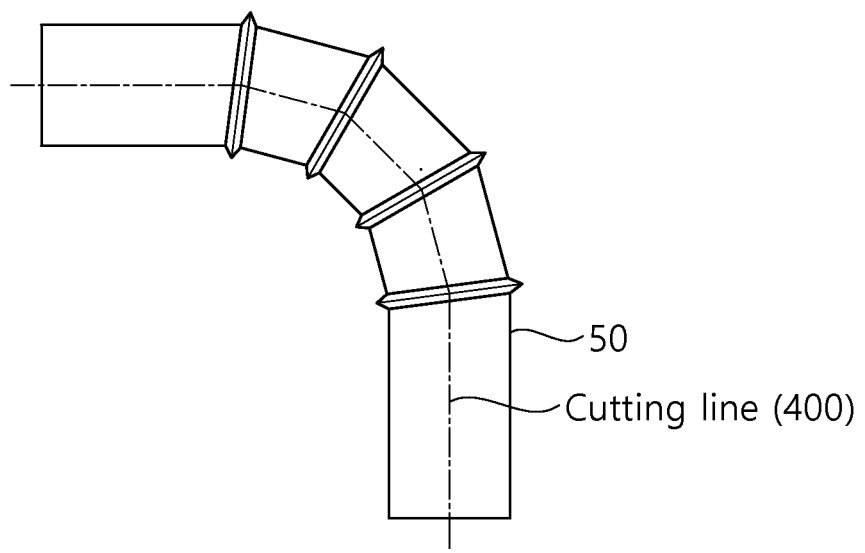
FIG. 4 is a conceptual diagram illustrating the occurrence of a defect at the sealing portion in a curve-cutting section and the formation of a notch for eliminating the defect.
Figure 4B:
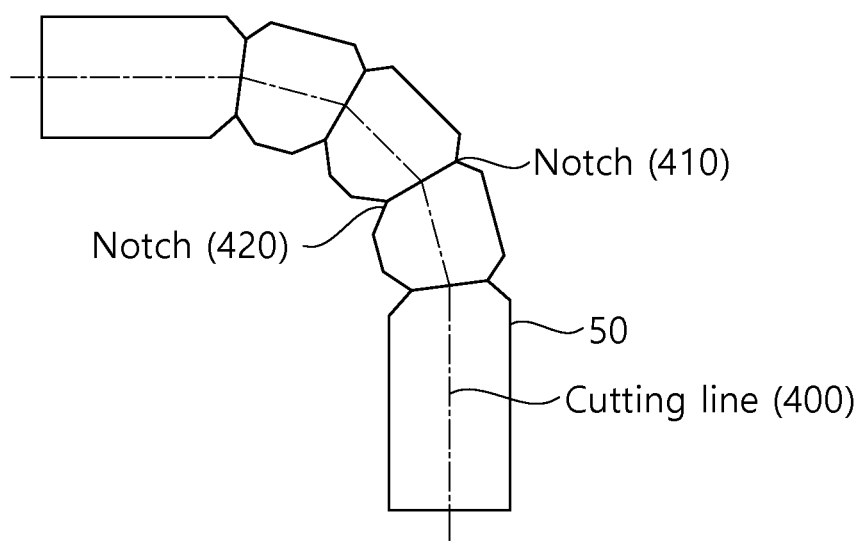

FIG. 4 is a conceptual diagram illustrating the occurrence of a defect at the sealing portion in a curve-cutting section and the formation of a notch for eliminating the defect.

Referring to (a) of FIG. 4, the cutting portion 140 cuts a fabric along a cutting line 400, and the sealing portion 150 behind the cutting portion 140 seals an open area of the cover 30 as it follows the cutting portion 140. In this case, there is no problem in sealing the open area in a linear section, but there might be a problem in a curved section. That is, as shown in FIG. 3, even if the sealing portion 150 connected to the cutting portion 140 via the link portion 160 seals the open area along with the rotation of the cutting portion 140, a sealing defect may be created as a sealing member 50 becomes crumpled. The open area of the cover 30 may not be completely enclosed, especially at a defective portion formed by the crumpling of the sealing member 50, which may lead to problems in compressing the fabric through the cover 30. This may cause the fabric to inflate, thereby leading to a failure to cut the fabric accurately. This phenomenon will become more serious as the curvature of a curved section becomes larger. In some cases, the sealing member 50 may not be attached to the cover 30 at all or may be broken.

To make up for this problem, according to an exemplary embodiment of the present invention, notches 410 and 420 may be formed on the sealing member 50. The notches 410 and 420 may be formed on opposite edges, transversely to the direction of transfer of the sealing member 50. The sealing member 50 may be broken at some parts through the notches 410 and 420, and the broken parts may be stretched on the outer side of the curved section and contracted on the inner side, thereby preventing the sealing member 50 from getting crumpled too much and enabling smooth sealing.

As such, the notches 410 and 420 formed on opposite edges of the sealing member 50 may come in various shapes. Also, the notches 410 and 420 may have different shapes. For example, the notches 410 formed on the outer side of the curved section may be larger in width, and the notches 420 formed on the inner edge may be smaller in width than the notches 410. Moreover, the notches 410 and 420 may have various shapes, such as linear, triangular, rectangular, pentagonal, semicircular, etc., and the spacing between the notches may vary with the curvature of the curved section.

Figure 5A:
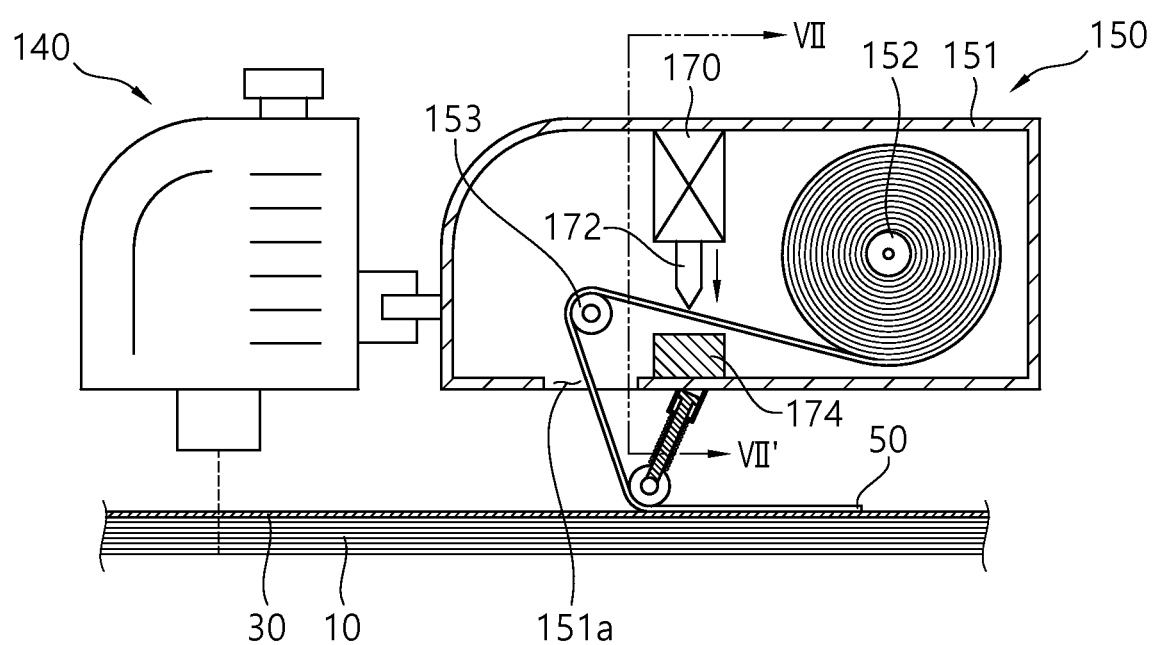
FIG. 5A is a cross-sectional view taken along the line V-V' of FIG. 3 from the sealing portion according to a first exemplary embodiment of the present invention.

FIG. 5A is a cross-sectional view taken along the line V-V' of FIG. 3 from the sealing portion according to a first exemplary embodiment of the present invention.

Referring to FIG. 5A, the sealing portion 150 may include a main body 151, a reel 152, a guide roller 153, a pressure roller 154, a pressure roller support 155, a sealing member cutting portion (including a cutter transfer portion 170, and a cutter 172, and a supporting base 174).

The main body 151 forms the exterior of the sealing portion 150, and the second link 163 is coupled to the foremost part of the main body 151. A roll-shaped sealing member 50 may be located within the main body 151. The sealing member 50 is supported by being wound around the reel 152 located within the main body 151. The sealing member 50 may be drawn out of the main body 151 through an outlet 151a opening down from the main body 151 and fed to the open area.

Here, the sealing member 50 may be in the form of film or tape coated with adhesive on one side. If the sealing member 50 is a film, it may be adsorbed onto the open area by the evacuation force of the vacuum pump 121 which evacuates the space between the plate 111 and the cover 30. On the other hand, if the sealing member 50 is in the form of film, it may be adsorbed more strongly onto the open area by the evacuation force of the vacuum pump 121 and the adhesive power of the adhesive.

Meanwhile, the guide roller 153 is located in the main body 151 and guides the sealing member 50 to be drawn out. That is, the guide roller 153 may be located close to the outlet 151a. The guide roller 153 guides the sealing member 50 from the reel 152 down to the open area. Also, the guide roller 153 prevents the sealing member 50 from becoming damaged by friction by keeping the sealing member 50 from coming into contact with the main body 151 when drawn out. The guide roller 153 is positioned further to the direction of transfer than the sealing member cutting portion 170, so that the cutting of the sealing member 50 is done in the space between the guide roller 153 and the reel 152. In this instance, the cutting of the sealing member may mean the formation of notches.

Meanwhile, the pressure roller 154 is supported by the pressure roller support 155 at the bottom of the main body 151. The pressure roller 154 presses the sealing member 50 being drawn down from the main body 151. Here, the pressure roller support 155 supporting the pressure roller 154 may slide and expand when the pressure roller 154 presses the sealing member 50.

The pressure roller support 155 may include a stationary portion 155a, a movable portion 155b, and an elastic body 155c.

The stationary portion 155a is fitted to the underside of the main body 151. The inside of the stationary portion 155a is formed with a space in which the top edge of the movable portion 155b can be inserted and lifted. Also, a ridge is formed at the bottom edge of the stationary portion 155a to prevent the top edge of the movable portion 155b from falling out from the stationary portion 155a. The top edge of the movable portion 155b is inserted into the stationary portion 155a and supported on it. Thus, the movable portion 155b may be lifted towards the internal space of the stationary portion 155a and cause the pressure roller 154 supported at the bottom to be lifted. The elastic body 155c is placed around the movable portion 155b between the stationary portion 155a and the pressure roller 154. The elastic body 155c produces a repulsive force between the stationary portion 155a and the pressure roller 154.

Hence, the movable portion 155b may be lifted up by a stress provided by the pressure roller 154, or may be lifted down by a repulsive force provided by the elastic body 155c.

Therefore, when the pressure roller 154 presses the sealing member 50, the pressure roller support 155 may be lifted along a curve formed in the open area and relieve the stress applied to the open area from the pressure roller 154.

As such, the sealing portion 150 behind the cutting portion 140 encloses the open area of the cover 30, along the path through which the cutting portion 140 passes. In view of this, the sealing portion 150 is advantageous in that it enables precise cutting of the fabrics 10 by preventing the fabrics 10 from being inflated and moved through the open area.

According to an exemplary embodiment of the present invention, the sealing member cutting portion may include a cutter transfer portion 170 cutter 172, and a supporting base 174. The cutter transfer portion 170 is fitted to the top or side of the main body. The cutter transfer portion 170 may include a hydraulic/pneumatic cylinder or a drive motor. Hence, the cutter transfer portion 170 may vertically reciprocate or rotate the cutter 172 connected to one side under control of a controller (not shown). Therefore, it is possible to form notches by cutting at least one edge of the sealing member 50 stretched between the guide roller 153 and the reel 152. The cutter 172 may be provided at a position on the cutter transfer portion 170 where the cutter 172 forms notches on at least one side of the sealing member 50, transversely to the direction of transfer.

The cutter 172 may have a blade that comes in a variety of shapes so as to correspond to notches of various shapes. The blade may be linear, triangular, rectangular, pentagonal, semicircular, etc. Also, the cutter 172 may have a plurality of blades and change them with one another for a suitable shape.

Moreover, the supporting base 174 may be provided to form more precise notches. The supporting base 174 is formed on the inside bottom of the main body 151. The supporting base 174 prevents the sealing member 50 from getting stretched too much by supporting the sealing member 50 when the sealing member 50 is cut by the vertical movement of the cutter 172. The supporting base 174 may be designed to be raised as the sealing member 50 is raised from under the main body 151 with the use of the sealing member 50.

Figure 5B:
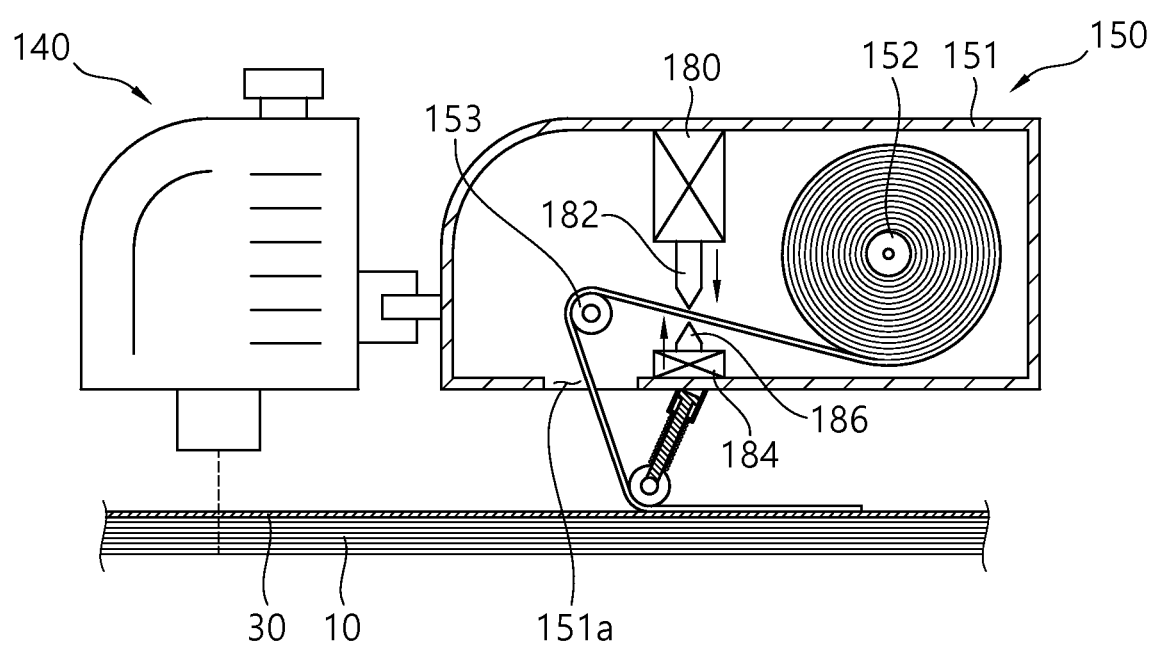
FIG. 5B is a cross-sectional view taken along the line V-V' of FIG. 3 from the sealing portion according to a second exemplary embodiment of the present invention.

FIG. 5B is a cross-sectional view taken, along the line V-V' of FIG. 3 from the sealing portion according to a second exemplary embodiment of the present invention.

Referring to FIG. 5B, the sealing member cutting portion may include a first cutter transfer portion 180, a first cutter 182, a second cutter transfer portion 184, and a second cutter 186. As in the first exemplary embodiment of FIG. 5A, the first cutter transfer portion 180 may be fitted to the top or side of the main body 151 and vertically reciprocate or rotate the cutter 182 connected to one side.

The second cutter transfer portion 184 may be fitted to the bottom of the main body 151 and vertically reciprocate or rotate the cutter 186 connected to one side. The second cutter transfer portion 184 may transfer the cutter 186 at the same point in time as the first cutter transfer portion 180. Thus, the blade of the first cutter 182 positioned in the upper part and the blade of the second cutter 186 positioned in the lower part may engage, thereby forming notches on at least one side of the sealing member 50.

According to another exemplary embodiment of the present invention, the first cutter 182 and the second cutter 186, configured to work the same as a nail clipper, may be riveted at one end, with a fixed axis (not shown) being inserted into the other end. Thus, a pressure plate (not shown), situated on top of a body (not shown) supporting the cutters 182 and 186, is coupled to the fixed axis, so that the first cutter 182 and second cutter 186 of the body engage by the pressure of the pressure plate.

Figure 6A:
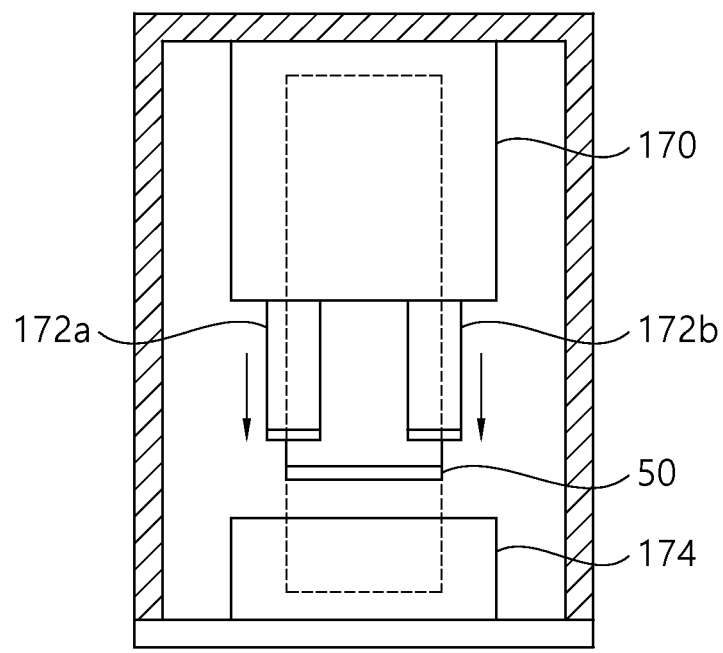
FIG. 6 is a cross-sectional view taken along the line VII-VII' of FIG. 5A from the sealing portion according to the first exemplary embodiment of the present invention.
Figure 6B:
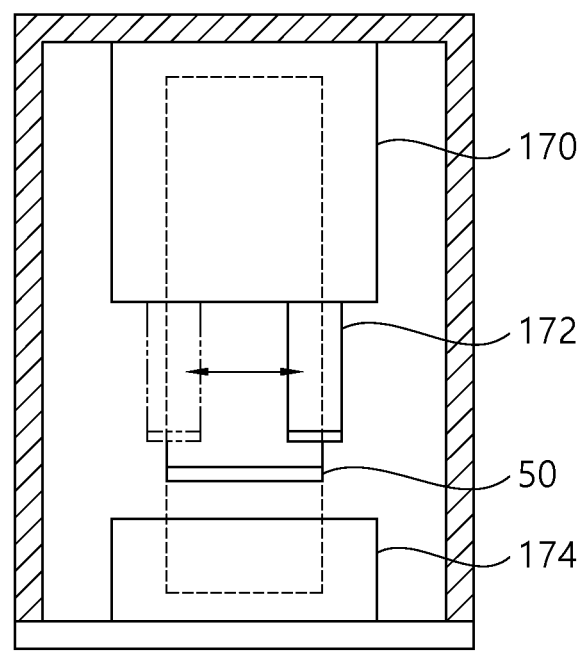

FIG. 6 is a cross-sectional view taken along the line VII-VII' of FIG. 5A from the sealing portion according to the first exemplary embodiment of the present invention.

Referring to (a) of FIG. 6, the cutter transfer portion 170 may have two cutters 172a and 172b above two ends of the sealing member 50. Thus, the sealing member 50 may be cut on the supporting base 174 by the vertical movements of the two cutters 172a and 172b, thereby forming notches.

The cutter transfer portion 170 may control the two cutters 172a and 172b in such a way that only one of them is transferred. That is, only the cutter 172b may be transferred, but not the cutter 172, or vice versa. In this instance, as described previously, the cutters 172a and 172b for forming notches on opposite edges of the sealing member 50 may vary in shape. That is, the cutters 172a and 172b may include a normal blade, a triangular blade, a rectangular blade, a circular blade, etc., and the cutters 172a and 172b may have different shapes. That is, the cutter 172a may have a triangular blade, whereas the cutter 172b may have a rectangular blade. Also, they may have a number of triangular blades having different central angles.

Referring to (b) of FIG. 6, the cutter transfer portion 170 may have one cutter 172 above the sealing member 50. The cutter 172 may be configured to move up and down or left and right. Therefore, the cutter 172 may form notches by cutting one side of the sealing member 50 by its up-and-down movement, and then move to the other side by its left-and-right movement and form notches by cutting the other side of the sealing member 50. This way, the cutter 172 may form notches on opposite edges of the sealing member 50 by its zigzag movement.

According to another exemplary embodiment of the present invention, linear notches, polygonal notches, semicircular notches, etc. may be formed as one blade is transferred. That is, the one blade may be set at an oblique angle to the supporting base, and linear notches, polygonal notches, and/or semicircular notches may be formed freely by the movement of the blade. In this case, notches may be formed in a preset shape or in response to a notch formation-related control signal. Notches of specific shapes may be formed by varying the width, central angle, and spacing on the two edges and center of the sealing member.

Figure 7A:
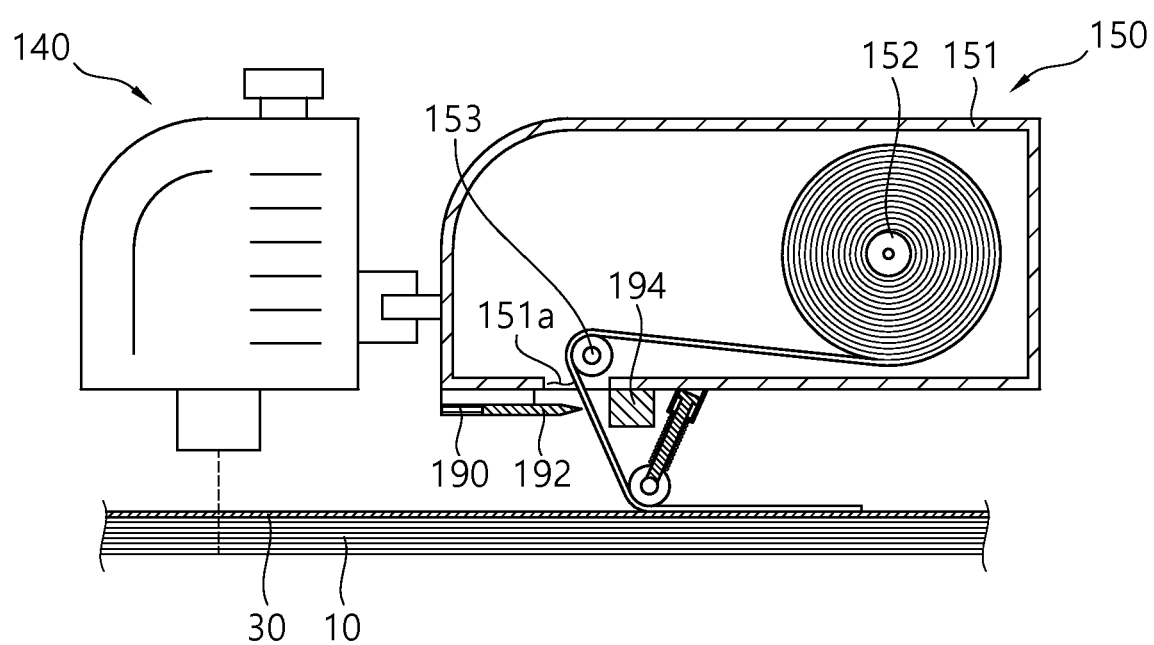
FIG. 7A is a cross-sectional view taken along the line V-V' of FIG. 3 from the sealing portion according to a third exemplary embodiment of the present invention.

FIG. 7A is a cross-sectional view taken along the line V-V' of FIG. 3 from the sealing portion according to a third exemplary embodiment of the present invention.

Referring to FIG. 7A, the cutter transfer portion 190 is fitted to the underside of the main body 151. The cutter transfer portion 190, too, may be provided as a hydraulic/pneumatic cylinder or a drive motor. Thus, the cutter transfer portion 190 may reciprocate the cutter 191 connected to one side between the guide roller 153 and the pressure roller 154 or rotate the cutter 192 between the guide roller 153 and the pressure roller 154.

Therefore, notches may be formed on at least one side of the sealing member 50 which is stretched between the pressure roller 154 pressing the sealing member 50 to the open area.

As stated previously, the cutter 192 may a blade that comes in a variety of shapes.

Moreover, a supporting base 194 may be provided at the bottom of the main body 151, opposite to the direction of transfer relative to an outlet at the bottom. The supporting base 194 may be formed on the outside bottom of the main body 151 and support the sealing member 50 when the sealing member 50 is cut by the reciprocating movement of the cutter 194.

Figure 7B:
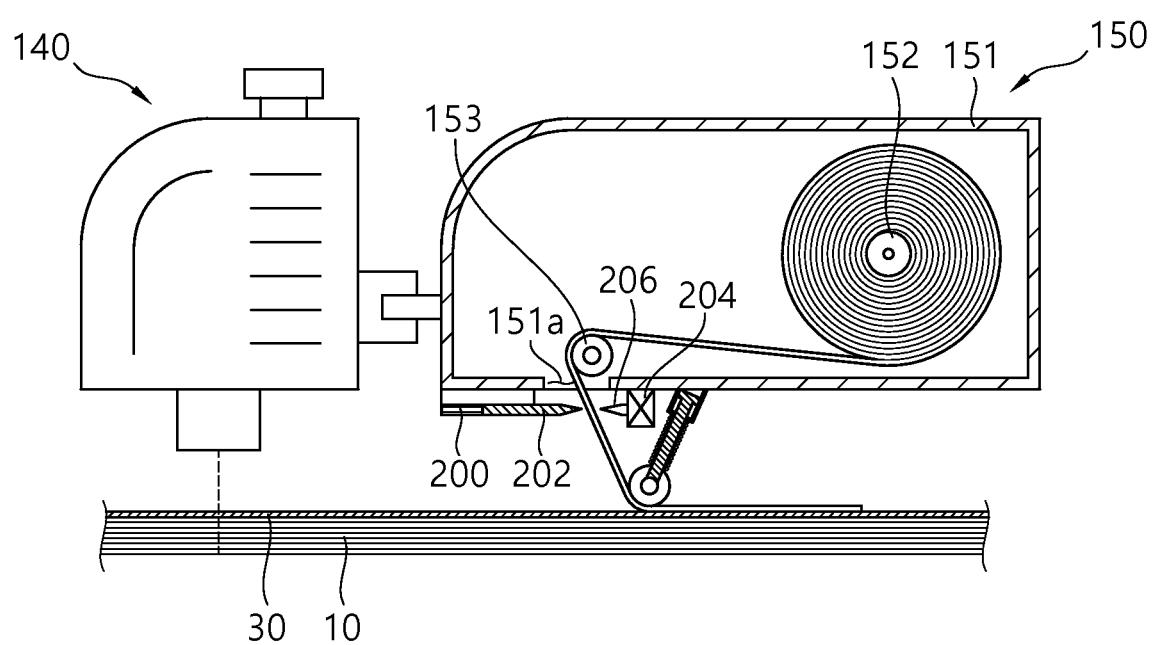
FIG. 7B is a cross-sectional view taken along the line V-V' of FIG. 3 from the sealing portion according to a fourth exemplary embodiment of the present invention.
Figure 8A:
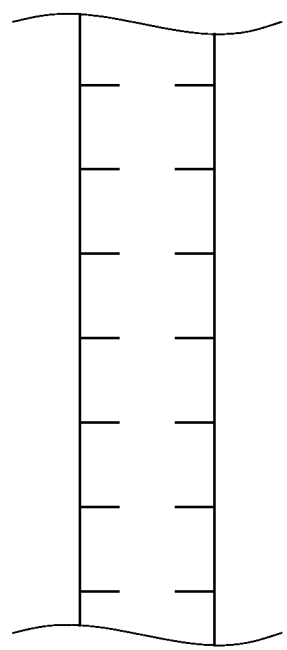
FIG. 8 is a view of the shapes of notches formed on the sealing member for a curved section of a raw fabric cutting device according to an exemplary embodiment of the present invention.
Figure 8B:
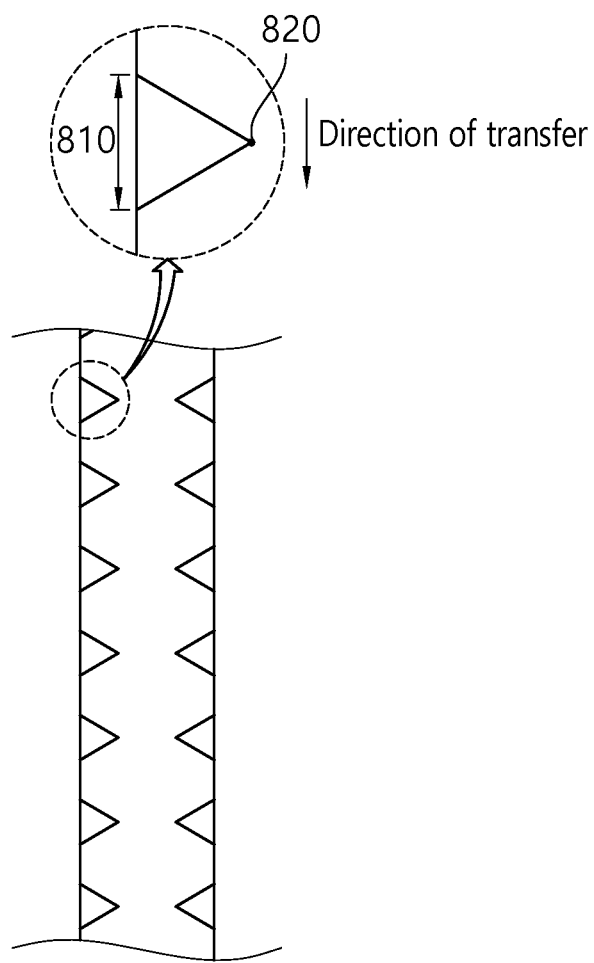
Figure 8C:
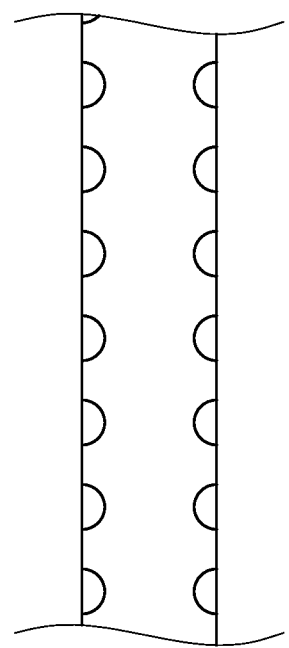
Figure 8D:
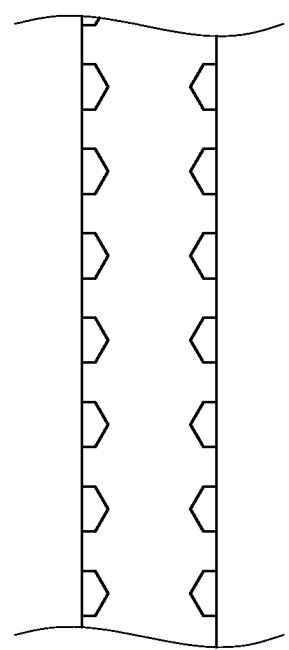
Figure 9A:
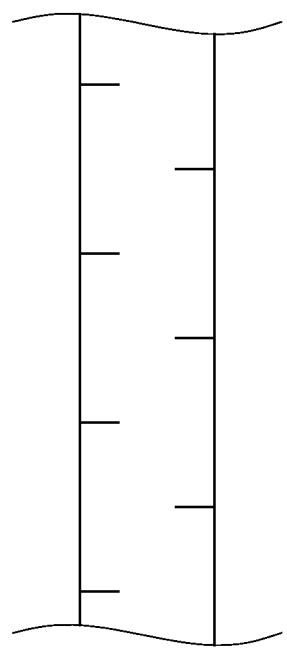
FIG. 9 is a view of the shapes of notches formed on the sealing member for a curved section of a raw fabric cutting device according to another exemplary embodiment of the present invention.
Figure 9B:
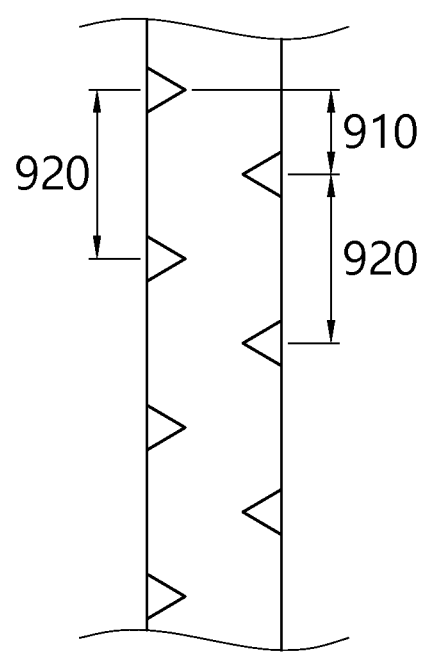
Figure 9C:
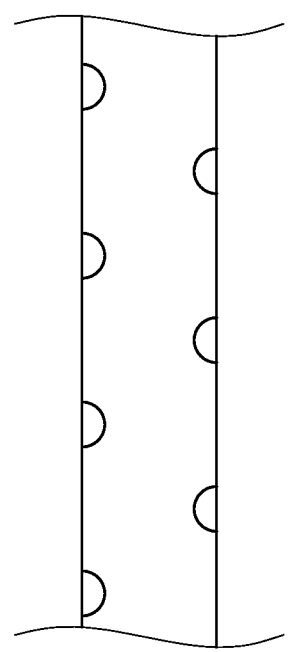
Figure 9D:
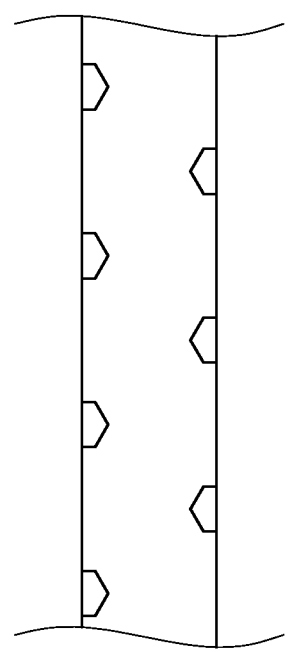
Figure 9E:
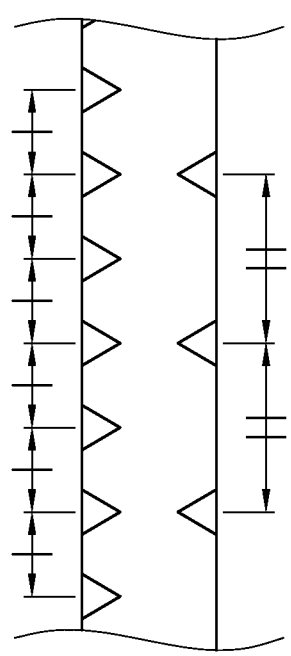
Figure 9F:
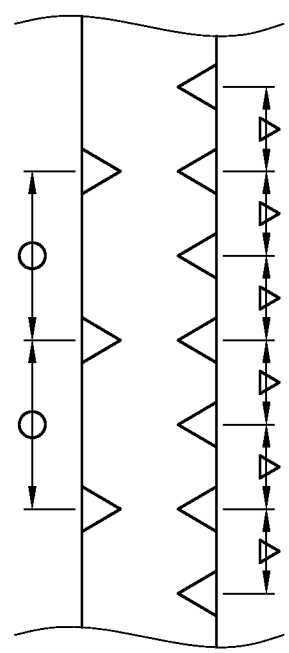

FIG. 7B is a cross-sectional view taken along the line V-V' of FIG. 3 from the sealing portion according to a fourth exemplary embodiment of the present invention.

Referring to FIG. 7B, the sealing member cutting portion may include a first cutter transfer portion 200, a first cutter 202, a second cutter transfer portion 204, and a second cutter 206. As in the first exemplary embodiment of FIG. 7A, the first cutter transfer portion 200 may be fitted to the bottom of the main body 151 and vertically reciprocate or rotate the cutter 202 connected to one side.

The second cutter transfer portion 204 may be fitted to the bottom of the main body 151 on the opposite side to an outlet at the bottom and horizontally reciprocate or rotate the cutter 206 connected to one side. In this instance, the second cutter 206 may be controlled in such a manner as to be transferred at the same timing as the first cutter 202. Thus, the blade of the first cutter 202 positioned in the direction of transfer and the blade of the second cutter 206 positioned on the opposite side may engage, thereby forming notches on at least one side of the sealing member 50.

According to another exemplary embodiment of the present invention, the first cutter 202 and the second cutter 206 may work the same as a nail clipper.

FIG. 8 is a view of the shapes of notches formed on the sealing member for a curved section of a raw fabric cutting device according to an exemplary embodiment of the present invention.

Referring to FIG. 8, the raw fabric cutting device according to an exemplary embodiment of the present invention may form notches in a variety of shapes. The shape of the notches largely includes at least one among linear, triangular, semicircular, pentagonal, and rectangular shapes.

Referring to (a) of FIG. 8, linear notches may be formed face-to-face on opposite edges of the sealing member 50. The linear may refer to a shape that is formed on both side edges of the sealing member 50 and runs a certain length towards the center of the sealing member 50. In this instance, the length of the linear notches or the spacing between the linear notches may be adjusted according to the curvature of the curved section. The linear notches do not necessarily have to be formed in a direction perpendicular to both side edges of the sealing member 50, but may be formed in an oblique direction as long as the sealing member 50 is transferred transversely.

Referring to (b) of FIG. 8, triangular notches may be formed. The notches may be formed face-to-face on opposite edges of the sealing member 50, transversely to the direction of transfer. Each triangular notch includes a face 810 formed on either side edge of the sealing member 50 and one vertex 820 pointing toward the center of the sealing member 50. The face 810 may be larger in width than the vertex 820. This also applies to notches of other shapes, and the longitudinal width of the notches at the edges of the sealing member 50 may be equal to or greater than the width of the notches near the center of the sealing member 50. For triangular notches, the central angle of the triangles may vary. That is, acute triangular notches having a central angle of 90 degrees or more and/or obtuse triangular notches having a central angle of 90 degrees or more may be formed. In this case, the central angle of the triangles may be determined according to the curvature of the curved section. This will be described in further detail below with reference to FIG. 14.

Referring to (c) of FIG. 8, semicircular notches may be formed. The semicircular notches, too, may be formed face-to-face on opposite edges of the sealing member 50. The spacing between the semicircular notches may be determined according to the size of the semicircles dependent on their radius. Moreover, the notches do not necessarily have to be semicircular but may be oval.

Referring to (d) of FIG. 8, polygonal notches may be formed. Here, the polygonal may include square, rectangular, trapezoidal, pentagonal, hexagonal, etc. Likewise, it is desirable that the width of the notches at the edges of the sealing member 50 may be equal to or greater than the width of the notches near the center of the sealing member 50.

According to another exemplary embodiment of the present invention, the notches do not necessarily have to be formed on both sides but may be formed only on one side.

FIG. 9 is a view of the shapes of notches formed on the sealing member for a curved section of a raw fabric cutting device according to another exemplary embodiment of the present invention.

Referring to (a) through (d) of FIG. 9, notches may be formed in a staggered manner on opposite edges of the sealing member 50 such that those on one side have a given spacing from the corresponding ones on the other side.

Notably, referring to (b) of FIG. 9, notches may be formed in a staggered manner on opposite edges of the sealing member 50 in such a way that the notches on the left side edge of the sealing member 50 have a first spacing 910 from the corresponding ones on the right side edge of the sealing member 50. In this case, the notches on the same side may have a second spacing 920 between them, so that the notches on opposite edges of the sealing member 50 are set parallel to each other in a staggered formation.

Referring to (e) of FIG. 9, the spacing between the notches on one side of the sealing member 50 and the spacing between the notches on the other side of the sealing member 50 may be different from each other. For example, those on one side of the sealing member 50 may have a wide spacing of 2 cm or more, whereas those on the other side of the sealing member 50 may have a narrow spacing of 0.5 cm or less. Hence, the notches on the outer side of a curve toward a particular direction allow for snug attachment of the sealing member 50 in a linear section between notches because of the wide spacing between them, whereas the notches on the inner side of the curve allow for proper attachment of the sealing member 50 in a linear section between notches because of the narrow spacing between them, in case the curvature of the curve is larger. However, it is not necessary for the curve to have wide spacing between notches on the outer side and narrow spacing between notches on the inner side, but vice versa is possible.

Referring to (f) of FIG. 9, it is possible to arbitrarily adjust which side of the sealing member 50 has narrow spacing between notches and which side of the sealing member 50 has wide spacing between notches, according to the user settings. Moreover, the sealing member 50 may be divided into sections so that one side of the sealing member 50 has relatively narrow spacing in a certain section and the other side of the sealing member 50 has relatively narrow spacing in another section.

Figure 10:
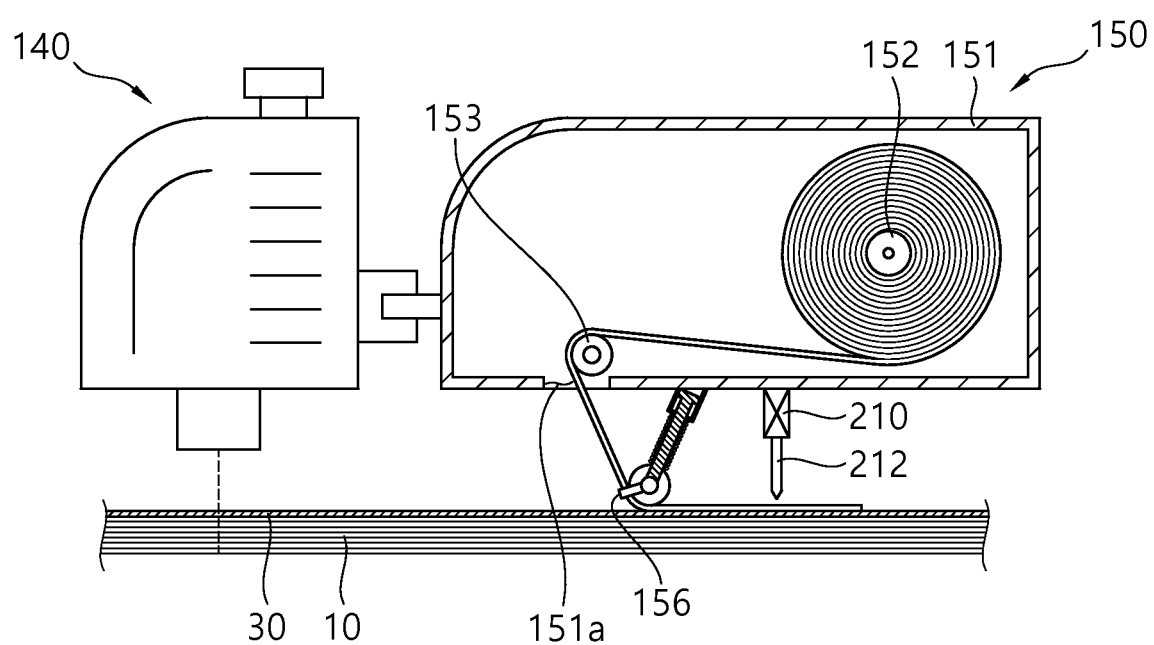
FIG. 10 is a cross-sectional view taken along the line V-V' of FIG. 3 from the sealing member separating portion of the raw fabric cutting device according to an exemplary embodiment of the present invention.

FIG. 10 is a cross-sectional view taken along the line V-V' of FIG. 3 from the sealing member separating portion of the raw fabric cutting device according to an exemplary embodiment of the present invention.

Referring to FIG. 10, the sealing member separating portion is positioned opposite to the direction of transfer relative to the pressure roller 154. The sealing member separating portion is located at the bottom of the main body 151 and completely cuts and separates the sealing member 50. The sealing member separating portion may include a cutter transfer portion 210 and a cutter 212.

The cutter transfer portion 210 may be provided as a hydraulic/pneumatic cylinder or a drive motor and cut the sealing member 50 attached on the cover 30 by reciprocating or rotating the cutter 212 connected to one side. In this case, the transfer width of the cutter needs to be precisely adjusted so as to keep the cutter 212 from getting to the cover 30 or fabrics 10 beneath the sealing member 50.

Moreover, the pressure roller 154 may include at least one guide 156 for guiding the sealing member 50 so as to keep it from getting away from the pressure roller 154. As a part of the sealing member 50 that is completely separated and hanging in the air is moved away from the pressure roller 154 by the guide 156, it is possible to avoid the risk of failing to perform the next sealing operation, which can occur when no part of the sealing member 50 is left that is to be cut next and attached by the pressure of the pressure roller 154. That is, once the cutting of one seamless cutting line is completed, the sealing member cutting portion may completely cut the sealing member 50, and the pressure roller 154 may be lifted. In this instance, the sealing member 50 moves towards the next cutting line by the guide 156 of the pressure roller 154 which is being lifted, while seated on the bottom of the pressure roller 154 without getting away from the guide 156.

Figure 11:
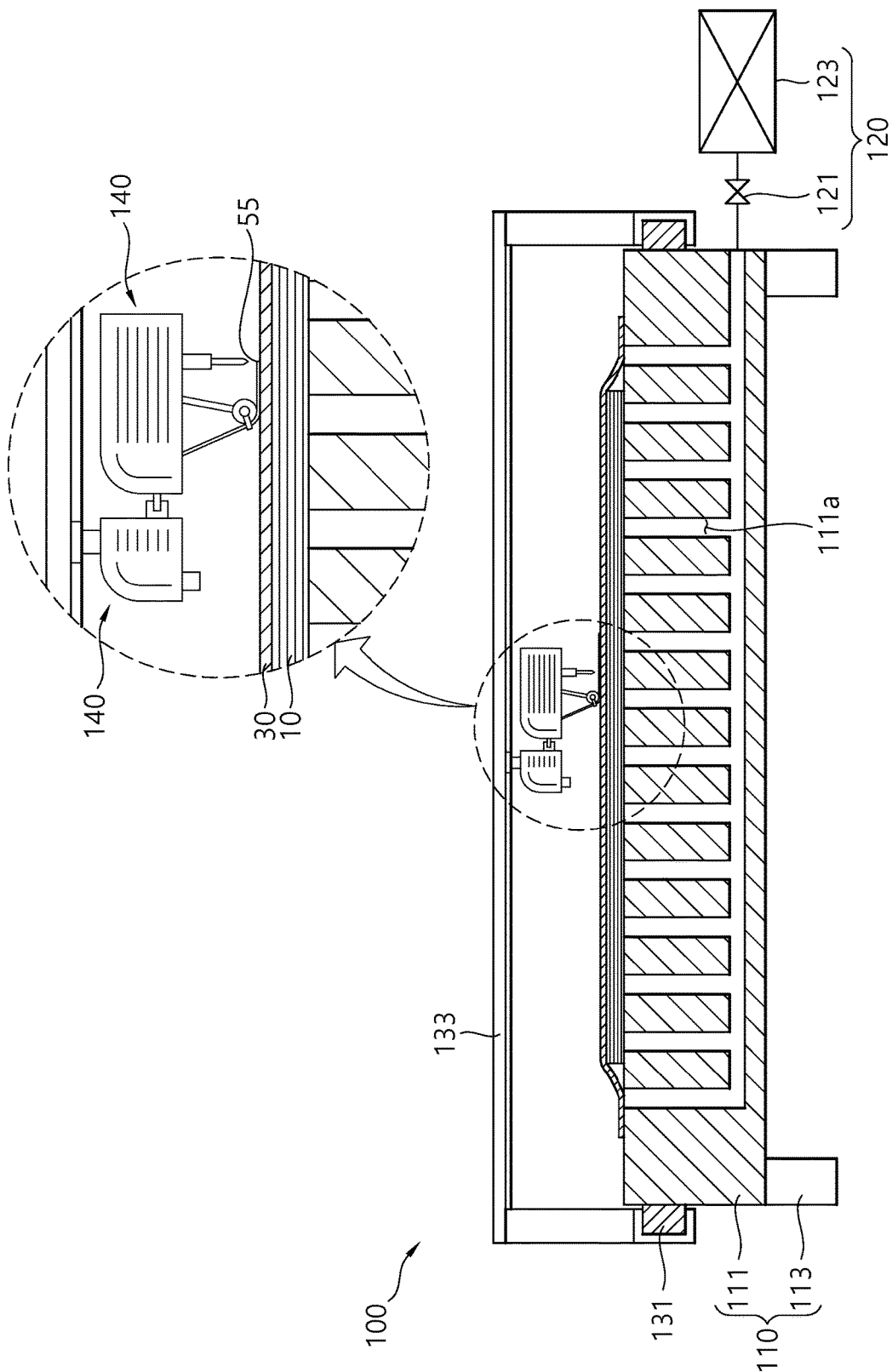
FIG. 11 is a cross-sectional view of a raw fabric cutting device upon completion of one cutting process, according to an exemplary embodiment of the present invention.

FIG. 11 is a cross-sectional view of a raw fabric cutting device according to an exemplary embodiment of the present invention upon completion of one cutting process.

Referring to FIG. 11, the raw fabric cutting device according to an exemplary embodiment of the present invention allows the stack of raw fabrics 10 and the cover 30 to be seated on top of the plate 111. The stack of raw fabrics 10 are seated on top of the plate 111 first, and then the cover 30 is placed over the fabrics 10. The cover 30 may be made from transparent resin such as vinyl that covers a wider area than the fabrics 10. Thus, a predetermined pattern formed on the fabrics 10 may be projected on the cover 30.

Afterwards, the cutting portion 140 and the sealing portion 150 may be transferred to the top of one area of the fabrics 10 that is to be cut first. In this instance, the first linear actuator 131 transfers the cutting portion 140 in the x-axis direction, and the second linear actuator 133 transfers the cutting portion in the y-axis direction, so that the cutting portion 140 is transferred in a flat plane above the fabrics 10. Here, one end of the sealing member 50 contained inside the sealing member may be drawn out of the sealing member 140 and placed adjacent to the cover 30.

When the cutting portion 140 and the sealing portion 150 are transferred to the top of one area of the fabrics 10 that is to be cut first, the control valve 123 is opened, and the vacuum pump 121 evacuates the space between the plate 111 and the cover 30 via the plurality of evacuation holes 111a formed in the plate 111. Hence, the fabrics 10 placed between the plate 111 and the cover 30 are compressed between the plate 111 and the cover 30 by the pressure of the cover 30 attached firmly to the plate 111. In this instance, the evacuation force applied between the plate 111 and the cover 30 may be controlled by opening or closing the control valve 123.

Afterwards, when the fabrics 10 are compressed, then the cutting portion 140 and the sealing portion 150 may be transferred together by the transfer portion 130 and perform cutting and sealing operations in real time. In this instance, the cutting portion 140 and the sealing portion 150 may perform cutting and sealing operations as they are transferred along the pattern formed on the fabrics 10 or in a preset direction.

As for the process of cutting the fabrics 10, the cutting portion 140 is transferred first, and then performs the cutting of the fabrics 10. Thus, an open area is formed on the cover 30. Next, the sealing portion 150 transferred following the rear of the cutting portion 140 rotates freely relative to the cutting portion 140 by means of the link portion 160, and seals the open area of the cover 30 formed by the cutting portion 140 (S500). Here, one end of the sealing member 50 drawn out from the sealing portion 150 and placed adjacent to the cover 40 may be adsorbed to the open area by the evacuation force of the vacuum pump 121.

Afterwards, the sealing member 50 is drawn out of the sealing portion 150 as the cutting portion 140 and the sealing portion 150 are transferred, and the open area formed along the path through which the cutting portion 140 passes is enclosed. In this instance, the sealing member may be drawn out from the sealing portion 150 by a drive motor (not shown), or may be drawn out as the sealing portion 150 is transferred while one area of the sealing member is adsorbed to the open area. In this case, the sealing portion 150 enables sealing without a break or crumple in a curved section by forming notches on at least one side of the sealing member 50.

Moreover, the pressure roller 154 is transferred over the open area, and presses the sealing member 50. In this instance, the pressure roller support 155 expands and contracts along a curve in the open area so as to prevent the movement of the cover 30 due to the stress applied to the cover 30 from the pressure roller 154. This prevents the fabrics 10 from being strewn due to the stress applied to the cover 30.

Afterwards, the cutting of the fabrics 10 is completed, the cutting portion 140 stops being transferred and discontinues cutting. At this point, the vacuum pump 121 may have stopped evacuating the space between the plate 111 and the cover 30. The cutter 212 of the sealing member separating portion cuts the sealing member 50 which is fed to the open area by the cutter transfer portion 210 in a direction opposite to the direction of transfer relative to the pressure roller 154. After completion of the cutting operation, one area 55 of the sealing member remains. If a part of the sealing member 50 is planned to be cut at the next position, the pressure roller 154 may be moved, with part 55 of the sealing member 50 attached to it, and perform cutting and sealing operations.

While one exemplary embodiment of the present invention has been described with an example in which the cutting portion 140 and the sealing portion 150 are provided as separate components and transferred together, the cutting portion 140 and the sealing portion 150 may be integrated together. Moreover, although the present exemplary embodiment has been described with an example in which a stack of raw fabrics 10 are placed beneath the cover 30, the cover 30 may be provided as an enclosed member and the stack of raw fabrics 10 may be compressed while contained within the cover 30, as shown in FIG. 1.

Additionally, although the present exemplary embodiment has been described with an example in which the cutting portion 140 and the sealing portion 150 work simultaneously, the cutting portion 140 and the sealing portion 150 may be run individually depending on the process.

Figure 12:
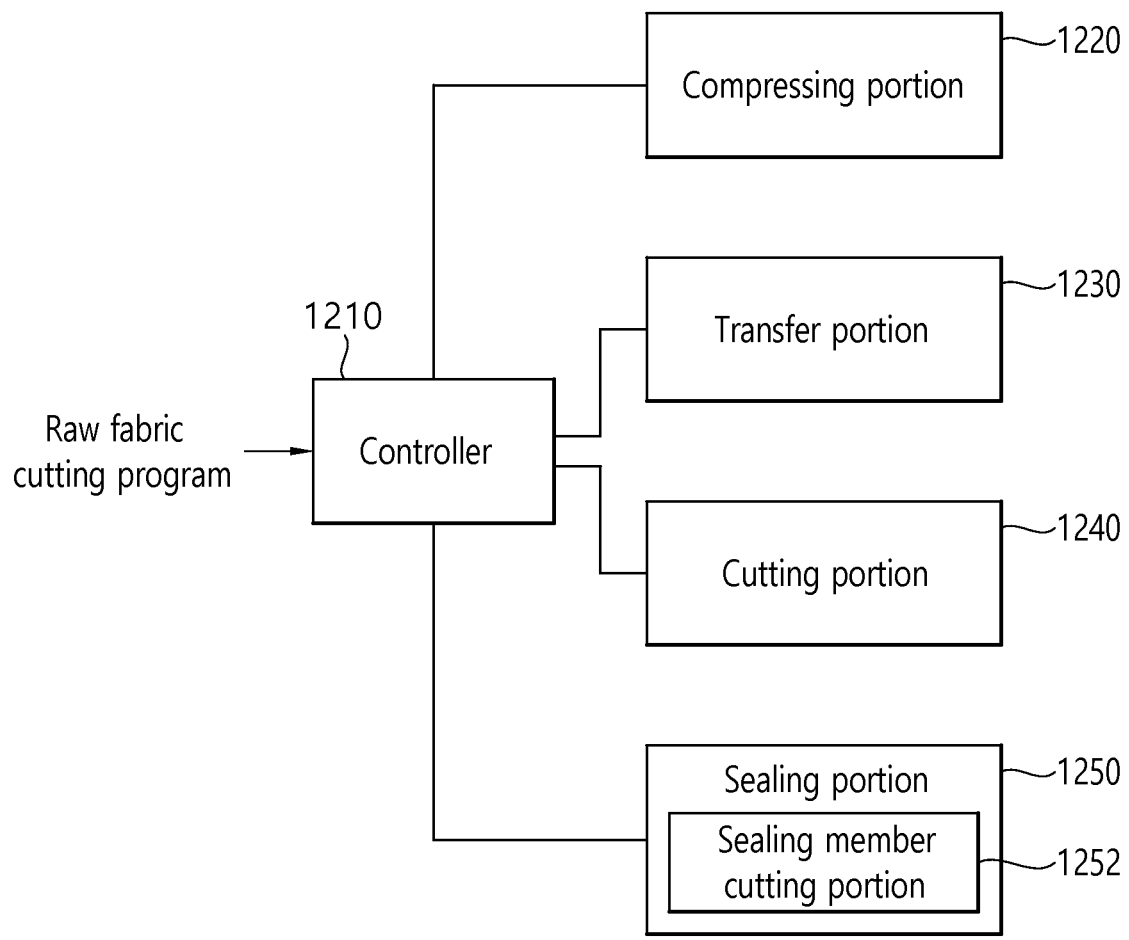
FIG. 12 is a block diagram schematically showing a raw fabric cutting device which controls components according to a raw fabric cutting program, according to an exemplary embodiment of the present invention.

FIG. 12 is a block diagram schematically showing a raw fabric cutting device which controls components according to a raw fabric cutting program, according to an exemplary embodiment of the present invention. As shown in FIG. 12, the raw fabric cutting device according to an exemplary embodiment of the present invention may include a controller 1210, a compressing portion 1220, a transfer portion 1230, a cutting portion 1240, and a sealing portion 1250.

Referring to FIG. 12, the controller 1210 is configured as a hardware processor, and includes a microprocessor capable of executing instructions. The controller 1210 may control at least one among the compressing portion 1220, transfer portion 1230, cutting portion 1240, and sealing portion 1250 by receiving a raw fabric cutting program. Here, the raw fabric cutting program may define a raw fabric cutting path and the components' operations for cutting. That is, the raw fabric cutting program may be a coded program that includes an algorithm for controlling the components so that cutting is done along the raw fabric cutting path. The raw fabric cutting program may be inputted directly by the user over a user interface, such as a mouse, keyboard, etc., or may be received from other devices. Alternatively, program data stored on a USB (universal series bus) drive may be inputted via an input port.

The controller 1210 may calculate an expected fabric cutting line by parsing an inputted raw fabric cutting program, and control the compressing portion 1220, transfer portion 1230, and cutting portion 1240 so that the cutting portion 1230 cuts fabrics along the calculated line. That is, the compressing portion 1220 may be controlled before cutting so that the fabrics are compressed by evacuating the area under the cover, and the transfer portion 1230 may be controlled so that the cutter of the cutting portion 1240 is transferred along the cutting line. Moreover, the cutting portion 1240 may be controlled to perform actual cutting, and the sealing portion 1240 may be controlled to seal the open area after the cutting operation of the cutting portion 1240.

In this case, the sealing member cutting portion 1242 included in the sealing portion 1240 may be controlled in such a manner as to extract a curved section from the calculated, expected fabric cutting line and form notches on the sealing member in the curved section. That is, the expected fabric cutting line may include a linear section and/or a curved section. Since the sealing member becomes crumpled, cutting and sealing operations are difficult to perform in a curved section unless notches are formed. Therefore, the controller 1210 may control the sealing portion 1240 and the sealing member cutting portion 1242 in such a manner as to extract a curved section from the expected fabric cutting line and form appropriate notches according to the characteristics of the extracted curved section.

According to another exemplary embodiment of the present invention, the controller 1210 may be implemented as a separate external device, separately from the raw fabric cutting device.

Figure 13:
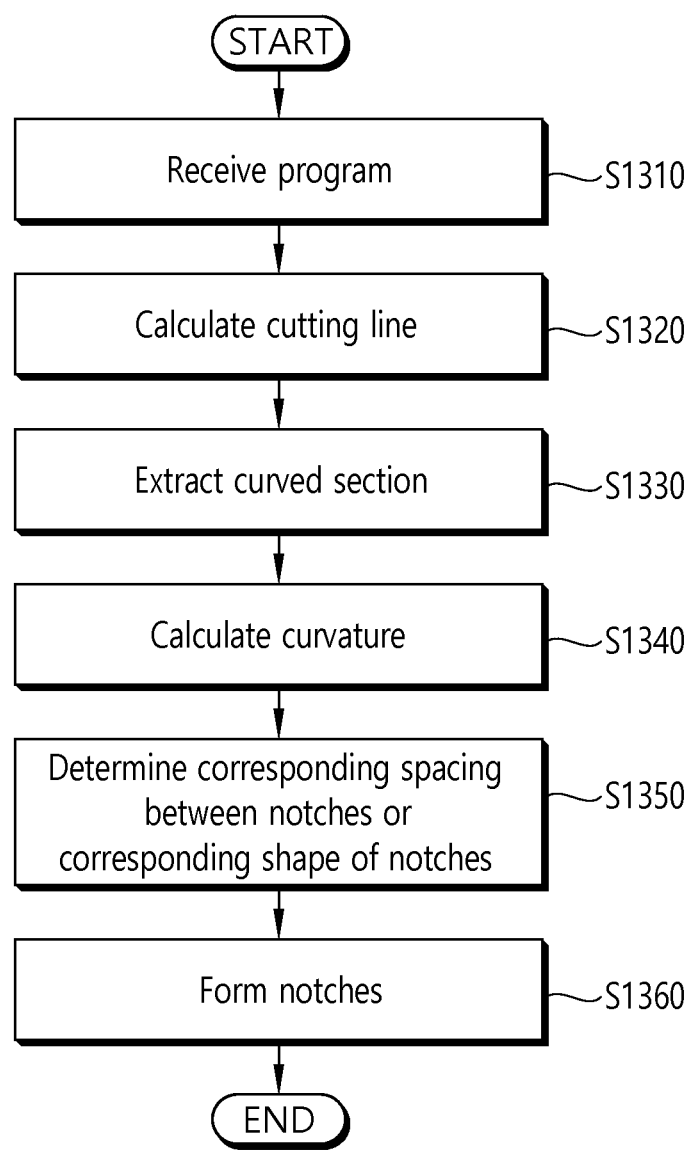
FIG. 13 is a detailed flowchart showing in detail a process in which a raw fabric cutting device forms notches along a curved line according to a raw fabric cutting program, according to an exemplary embodiment of the present invention.

FIG. 13 is a detailed flowchart showing in detail a process in which a raw fabric cutting device forms notches along a curved line according to a raw fabric cutting program, according to an exemplary embodiment of the present invention.

Referring to FIG. 13, a raw fabric cutting program is inputted into the controller of the raw fabric cutting device (S1310). As mentioned before, a raw fabric cutting program may be inputted directly from the user, inputted via a storage medium such as a USB drive, or received from other devices via communication means.

The controller calculates an expected cutting line by parsing the inputted program (S1320). Then, a curved section is extracted from the expected cutting line (S1330). In this instance, it is assumed that the curved section has a curvature equal to or greater than a given value. That is, if the curvature is less than a threshold, this means that providing the sealing member in a linear section will be enough, which therefore makes it unnecessary to form notches on the sealing member. Accordingly, for efficient sealing operation, a section having a curvature equal to or greater than a preset threshold may be deemed as a curved section.

The controller calculates the curvature of the extracted curved section (S1340). If the curvature varies, that section is divided into different curved subsections, and the curvature of each curved subsection is calculated. Then, the spacing between notches and/or the shape of notches is determined according to the calculated curvature (S1350). The spacing between notches and/or the shape of notches may be determined by a preset algorithm. That is, the controller may retrieve a notch formation algorithm according to the user settings stored in memory (not shown) and determine the spacing between notches and/or the shape of notches according to the correspondence relationship defined by the algorithm. Alternatively, the notch formation algorithm may be included in a raw fabric cutting program to determine a number of parameters for notch formation by parsing the program.

Next, notches are formed on opposite edges of the sealing member according to the determined the spacing between notches and/or the shape of notches (S1360).

Figure 14:
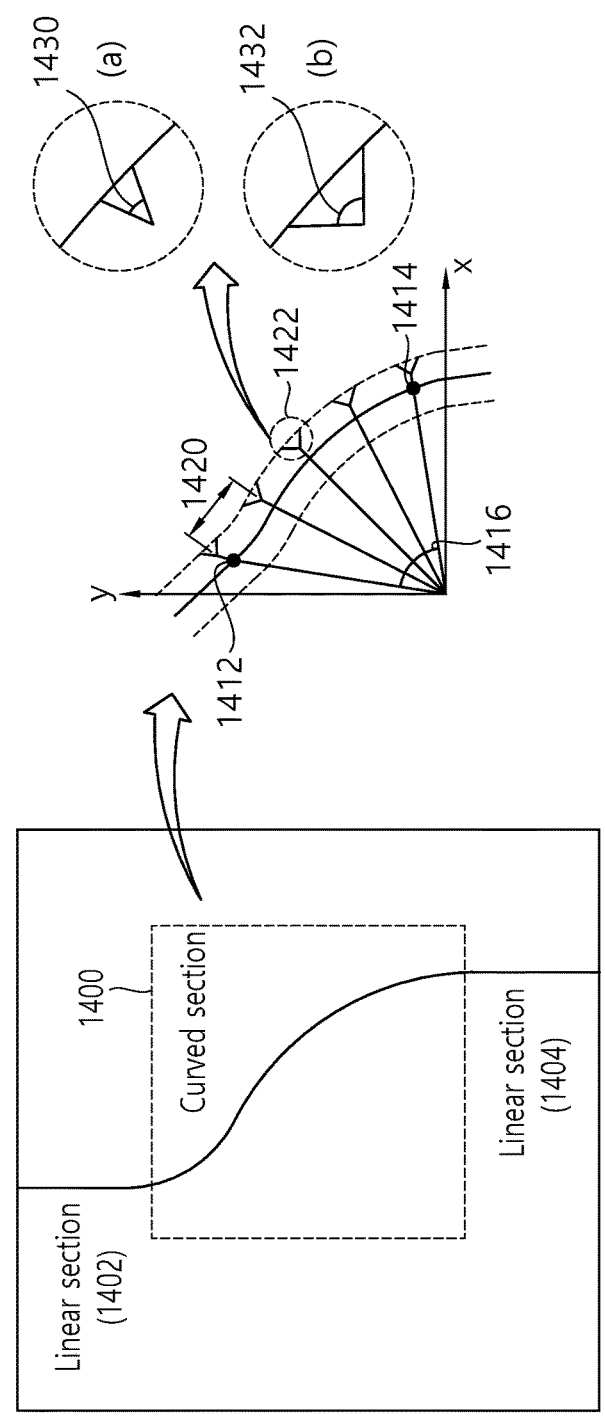
FIG. 14 is a conceptual diagram for explaining how a curved section is extracted from an analyzed, preliminary cutting line and the spacing between notches and the shape of notches are determined according to the curvature of the extracted curved section.

FIG. 14 is a conceptual diagram for explaining how a curved section is extracted from an analyzed, preliminary cutting line and the spacing between notches and the shape of notches are determined according to the curvature of the extracted curved section.

Referring to FIG. 14, the controller extracts a curved section 1400 from a calculated, expected fabric cutting line (which may include a linear section 1402, a curved section 1400, and a linear section 1406).

In the extracted curved section, the controller determines the starting point 1412 and ending point 1414 of the curved section. That is, to clearly define the curved section, the points where it starts and ends are set as the starting point 1412 and the ending point 1414, respectively. Then, the controller calculates the curvature of a cutting line that runs from the starting point 1412 to the ending point 1414. In this instance, if curves having different curvatures are connected together, they may be seen as different curved sections when calculating their curvature. The connected curved sections may be identified as different, and the starting point 1412 and ending point 1414 of each individual curved section may be set. The curvature is calculated as the rate of change of the tangent to the curve with respect to the arc-length, and is proportional to the degree of bending.

Once the curvature is calculated, the controller may determine the spacing 1420 between notches or the shape 1422 of notches, corresponding to the calculated curvature. According to the exemplary embodiment of the present invention, the larger the curvature, the more desirable it is to provide narrow spacing 1420 between notches. This is because, with a large curvature, it is highly likely that the sealing member gets crumpled when sealing is performed on the curve. Thus, it is desirable to make a plurality of notches in a curved section in order to prevent a crumpling or break. For example, if the curvature is 18.0, the spacing between notches may be set to 1 cm, and if the curvature is 10.0, the spacing 1420 between notches may be set to 2 cm. The spacing 1420 between notches corresponding to the curvature may be mathematically calculated by a specific inversely proportional formula. Alternatively, the spacing 1420 between notches may be determined within a set range by using a mapping table. For example, a mapping table may be set in such a manner that a curvature from 10 to 11 corresponds to 2 cm and a curvature from 11 to 12 corresponds to 1.8 cm. Once the curvature is calculated, the device may retrieve the corresponding spacing value from the mapping table and form notches with this spacing.

Furthermore, according to another exemplary embodiment of the present invention, a notch shape corresponding to a specific curvature may be set. For example, notch shapes appropriate for each curvature range may be stored in table form in such a manner that linear notches correspond to a curvature from 15 to 17 and triangular notches correspond to a curvature from 17 to 19.

Moreover, notches having the same shape may vary in central angle (in the case of triangular notches) or in radius (in the case of semicircular notches) according to the curvature. For example, with a small curvature, triangular notches may have a narrow central angle 1430 (see (a) of FIG. 14), and with a large curvature, triangular notches may have a wide central angle 1432 (see (b) of FIG. 14).

Figure 15:
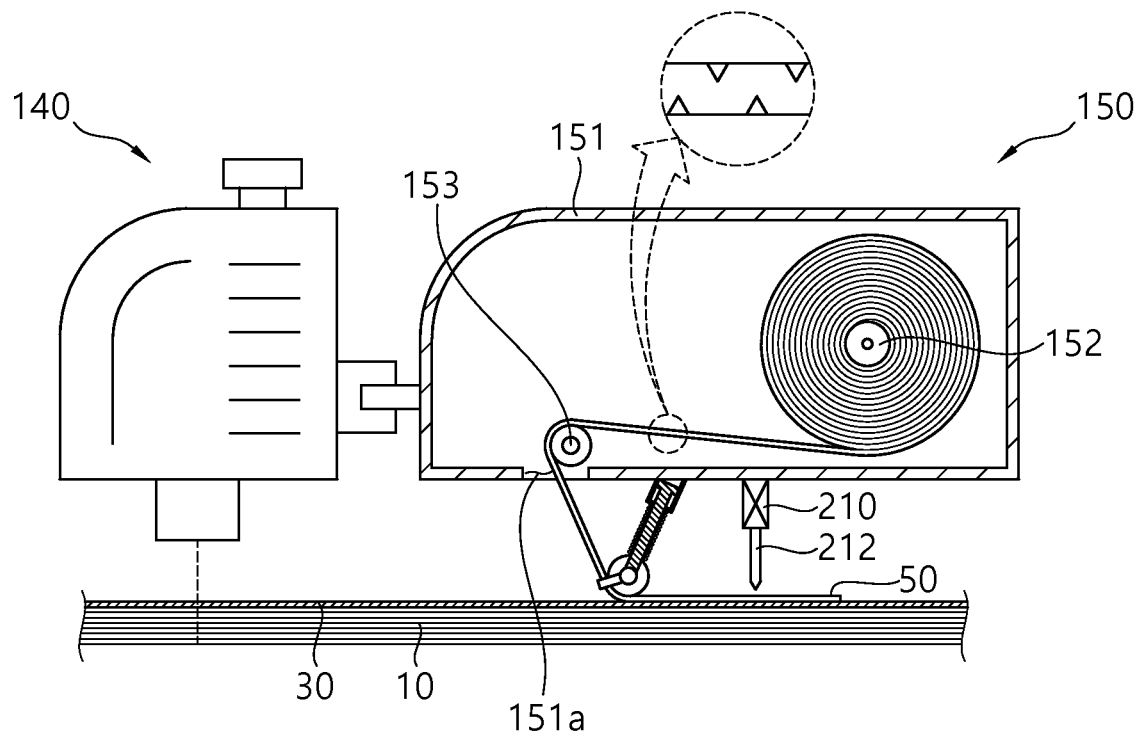
FIG. 15 is a cross-sectional view of a raw fabric cutting device where a sealing member with notches is loaded according to still another exemplary embodiment of the present invention.

FIG. 15 is a cross-sectional view of a raw fabric cutting device where a sealing member with notches is loaded according to still another exemplary embodiment of the present invention.

Referring to FIG. 15, the raw fabric cutting device according to another exemplary embodiment of the present invention may have a sealing member 50 with notches loaded inside the main body 151. That is, a sealing member cutting portion for forming notches is not required, and a sealing member 50 with notches formed on it may be loaded and fed to the open area by the guide roller 153 and the pressure roller 154.

In this exemplary embodiment, notches may have various shapes, for example, linear, triangular, rectangular, pentagonal, semicircular, etc. Also, the spacing between notches may be set to vary. Besides, the central angle of notches (triangular notches), the radius of notches (semicircular notches), the length of notches (linear notches), the arrangement of notches (whether they are placed in a face-to-face arrangement or in a staggered arrangement on opposite edges of the sealing member), the number of notches formed, and so forth may be properly determined, thereby enabling the formation of notches in various shapes.

According to an exemplary embodiment of the present invention, the sealing member 50 may have a width corresponding to the size of notches. For example, the size of notches may refer to the area of notches if the notches are polygonal and semicircular, or may refer to the length of notches if the notches are linear. That is, the sealing member 50 with notches that are large in size are likely to break when sealing is performed in a curved section, and therefore it is desirable to use a proper length sealing member 50 fitted to the size of notches.

Although the present invention has been described with reference to the drawings and embodiments, the scope of the invention is not intended to be limited to the drawings and embodiments, and a person having ordinary skill in the art will understand that the present invention may be modified and changed in various ways without departing from the spirit and scope of the present invention which are written in the claims.

What is claimed is:

1. A raw fabric cutting device comprising:
   a base including a support portion and a plurality of frames disposed under the support portion, the base configured to support a raw fabric on the support portion;
   a structure including a vacuum pump and a control valve, the structure configured to compress the raw fabric by evacuating the space between a cover placed over the raw fabric and the support portion;
   a raw fabric cutting portion that is transferred above the support portion and cuts the raw fabric; and
   a sealing portion that is transferred along with the raw fabric cutting portion and feeds a sealing member to an open area of the cover to enclose an area of the cover exposed as the raw fabric is cut, the sealing portion comprising a sealing member cutting portion which includes a cutter transfer portion, a supporting base disposed in opposition to the cutter transfer portion, and a cutter driven by the cutter transfer portion toward the supporting base,
   wherein the sealing member cutting portion is configured to form notches on at least one side of the sealing member using the cutter, the notches being formed transversely to a direction of transfer of the sealing member.

2. The raw fabric cutting device of claim 1, wherein the sealing member cutting portion forms notches with a predetermined spacing on at least one side of the sealing member, the notches being formed transversely to the direction of transfer of the sealing member.

3. The raw fabric cutting device of claim 2, wherein the sealing member cutting portion forms notches on opposite sides of the sealing member, transversely to the direction of transfer of the sealing member, in such a manner that a spacing between notches on a first side and a spacing between notches on a second are different from each other.

4. The raw fabric cutting device of claim 2, wherein the sealing member cutting portion forms notches with a predetermined spacing in a face-to-face manner on opposite sides of the sealing member.

5. The raw fabric cutting device of claim 2,
   wherein the sealing member cutting portion forms notches with a first spacing on either side of the sealing member,
   wherein the notches are formed in a staggered manner on opposite sides of the sealing member and include notches on one side staggered relative to notches on the opposite side, such that the notches on one side have a second spacing.

6. The raw fabric cutting device of claim 1, wherein each of the notches on at least one side of the sealing member has a width greater than or equal to a width of notches near a lateral center of the sealing member.

7. The raw fabric cutting device of claim 1, wherein the notches have at least one of linear, triangular, rectangular, pentagonal, and semicircular shapes.

8. The raw fabric cutting device of claim 1, further comprising a link portion connecting the raw fabric cutting portion and the sealing portion, the link portion comprising:
   a first link configured at a rear of the raw fabric cutting portion relative to the direction of transfer of the raw fabric cutting portion;
   a second link configured at a foremost part of the sealing portion so as to engage with the first link; and
   a link pin fastened to the first and second links so that the sealing portion rotates along with the raw fabric cutting portion.

9. The raw fabric cutting device of claim 1, wherein the sealing portion comprises:
   a main body inside which the sealing member is supported;
   a reel around which the sealing member is wound;
   a guide roller positioned over an outlet at a bottom of the main body so as to draw the sealing member out of the main body from the reel; and
   a pressure roller that is supported on the main body and presses the sealing member, drawn down to the outlet by the guide roller, to the open area.

10. The raw fabric cutting device of claim 9, wherein the sealing portion further comprises a pressure roller support that supports the pressure roller from the main body, the pressure roller support comprising:
   a stationary portion that has one end supported on the main body and has another end including an internal space;
   a movable shaft having a top edge configured to be inserted in the internal space of the stationary portion such that the movable shaft slides with respect to the stationary portion; and
   an elastic body that is placed between the stationary portion and the movable shaft and elastically supports the movable shaft with respect to the stationary portion.

11. The raw fabric cutting device of claim 9, wherein the cutter transfer portion is attached to the main body, and the cutter is connected to the cutter transfer portion.

12. The raw fabric cutting device of claim 11, wherein the cutter forms notches on the sealing member between the guide roller and the pressure roller.

13. The raw fabric cutting device of claim 11, wherein the cutter forms notches on the sealing member between the reel and the guide roller.

14. The raw fabric cutting device of claim 11, wherein the cutter comprises one blade and forms notches on the sealing member by reciprocating movement.

15. The raw fabric cutting device of claim 14, wherein the sealing member cutting portion further comprises a support that is positioned on an opposite side of the cutter, with the sealing member in between, and supports the sealing member when the sealing member is cut.

16. The raw fabric cutting device of claim 11, wherein the cutter comprises a top blade and a bottom blade, and forms notches on the sealing member as the top blade and the bottom blade engage.

17. The raw fabric cutting device of claim 11, wherein the cutter transfer portion transfers the cutter either transversely or longitudinally to the direction of transfer of the sealing member to allow the cutter to form notches.

18. The raw fabric cutting device of claim 11, further comprising a sealing member separator that is located at the bottom of the main body, opposite to the direction of transfer relative to the pressure roller, the sealing member the sealing member separator including a cutter driven by a cutter transfer portion.

19. The raw fabric cutting device of claim 1, further comprising a controller that controls the raw fabric cutting portion and the sealing portion by a raw fabric cutting program,
   wherein the controller calculates a cutting line by parsing the raw fabric cutting program and controls the sealing member cutting portion along the calculated line.

20. The raw fabric cutting device of claim 19, wherein the controller controls the sealing member cutting portion to extract a curved section from the calculated line and form the notches in the extracted curved section.

21. The raw fabric cutting device of claim 20, wherein the controller determines the spacing between notches formed on at least one side of the sealing member based on a curvature of the extracted curved section.

22. The raw fabric cutting device of claim 20, wherein the controller determines a shape of notches formed on at least one side of the sealing member based on a curvature of the extracted curved section.

23. The raw fabric cutting device of claim 20, wherein the controller determines a central angle of triangular notches formed on at least one side of the sealing member based on a curvature of the extracted curved section.

24. A raw fabric cutting method comprising:
   compressing a raw fabric by evacuating a space between a cover placed over the raw fabric and a support portion for supporting the raw fabric;
   transferring a raw fabric cutting portion above the support portion in order to cut the raw fabric;
   feeding a sealing member by a sealing portion to an open area of the cover to enclose an area of the cover exposed as the raw fabric is cut, the sealing portion being transferred along with the raw fabric cutting portion; and
   forming notches on at least one side, transversely to a direction of transfer of the sealing member.

25. The raw fabric cutting method of claim 24, further comprising controlling the raw fabric cutting portion and the sealing portion by a raw fabric cutting program, the controlling comprising:
   calculating a cutting line by parsing the raw fabric cutting program;
   extracting a curved section from the calculated line;
   calculating a curvature of the extracted curved section; and
   forming notches based on the calculated curvature.

26. The raw fabric cutting method of claim 25, wherein the forming of notches comprises determining notch formation parameters based on the curvature of the extracted curved section.

* * * * *